United States Patent

Odashima et al.

(10) Patent No.: US 9,590,908 B2
(45) Date of Patent: Mar. 7, 2017

(54) DISTRIBUTED DATA PROCESSING DEVICE AND DISTRIBUTED DATA PROCESSING METHOD

(71) Applicant: FUJITSU LIMITED, Kawasaki-shi, Kanagawa (JP)

(72) Inventors: Shigeyuki Odashima, Tama (JP); Miwa Okabayashi, Sagamihara (JP)

(73) Assignee: FUJITSU LIMITED, Kawasaki (JP)

(*) Notice: Subject to any disclaimer, the term of this patent is extended or adjusted under 35 U.S.C. 154(b) by 164 days.

(21) Appl. No.: 14/657,798

(22) Filed: Mar. 13, 2015

(65) Prior Publication Data

US 2015/0281084 A1    Oct. 1, 2015

(30) Foreign Application Priority Data

Mar. 31, 2014 (JP) .................................. 2014-072194

(51) Int. Cl.
   *G06F 15/16*  (2006.01)
   *H04L 12/801* (2013.01)
   *H04L 29/08*  (2006.01)

(52) U.S. Cl.
   CPC .............. *H04L 47/11* (2013.01); *H04L 67/10* (2013.01)

(58) Field of Classification Search
   CPC .................................. H04L 47/11; H04L 67/10
   See application file for complete search history.

(56) References Cited

U.S. PATENT DOCUMENTS

| 5,459,871 | A |   | 10/1995 | Van Den Berg |
|-----------|---|---|---------|--------------|
| 5,835,766 | A |   | 11/1998 | Iba et al. |
| 5,845,117 | A |   | 12/1998 | Fujita |
| 7,644,197 | B1 | * | 1/2010 | Waldorf ................. G06F 9/524 710/105 |

(Continued)

FOREIGN PATENT DOCUMENTS

| JP | 6-214967 | 8/1994 |
| JP | 6-337798 | 12/1994 |

(Continued)

OTHER PUBLICATIONS

Richard C. Holt; "Some Deadlock Properties of Computer Systems", ACM Computing Surveys, vol. 4, No. 3, pp. 179-196, Sep. 1972.

(Continued)

*Primary Examiner* — Jonathan Bui
(74) *Attorney, Agent, or Firm* — Fujitsu Patent Center

(57) ABSTRACT

A processor receives a deadlock detection message transferred between a plurality of controlled devices so as to be transferred between a plurality of nodes along a first link and a second link, and determines whether a deadlock has occurred on the basis of a history of the deadlock detection message. The plurality of nodes are combined using the first link extending from a first node to a second node and the second link extending from a third node to a fourth node. The first node corresponds to a first controlled device whose control right a first terminal has. The second node corresponds to a second controlled device whose control right the first terminal has. The third node corresponds to a third controlled device whose control right a second terminal has. The fourth node corresponds to a fourth controlled device whose control right the second terminal waits to be given.

15 Claims, 38 Drawing Sheets

(56) References Cited

U.S. PATENT DOCUMENTS

| | | | |
|---|---|---|---|
| 2007/0297434 A1* | 12/2007 | Arndt | H04L 41/0659 |
| | | | 370/412 |
| 2008/0195759 A1 | 8/2008 | Novik et al. | |
| 2014/0089346 A1* | 3/2014 | Li | G06F 17/30215 |
| | | | 707/781 |
| 2014/0250441 A1* | 9/2014 | Tonouchi | G06F 11/3604 |
| | | | 718/106 |

FOREIGN PATENT DOCUMENTS

| | | |
|---|---|---|
| JP | 8-137707 | 5/1996 |
| JP | 2000-20324 | 1/2000 |
| JP | 2010-518520 | 5/2010 |
| JP | 2011-232926 | 11/2011 |
| WO | 2008/100795 | 8/2008 |

OTHER PUBLICATIONS

K. Mani Chandy, et al.; "Distributed Deadlock Detection", ACM Transactions on Computer Systems, vol. 1, No. 2, pp. 144-156, May 1983.

\* cited by examiner

PREVIOUS NODE/NEXT NODE
(INDICATE CONTROL BY SAME TERMINAL)

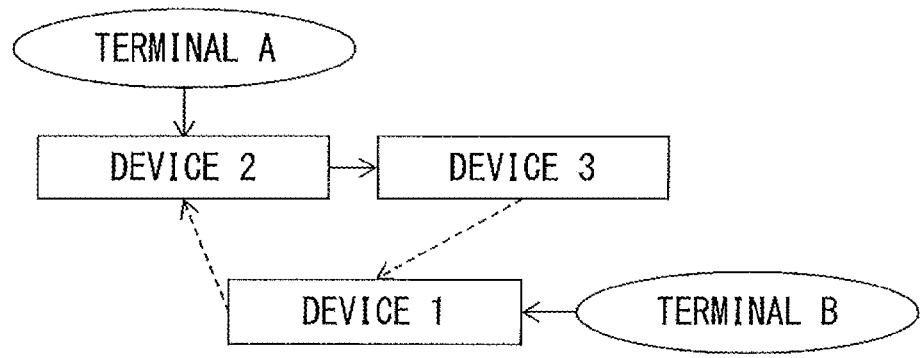
F I G. 1 0

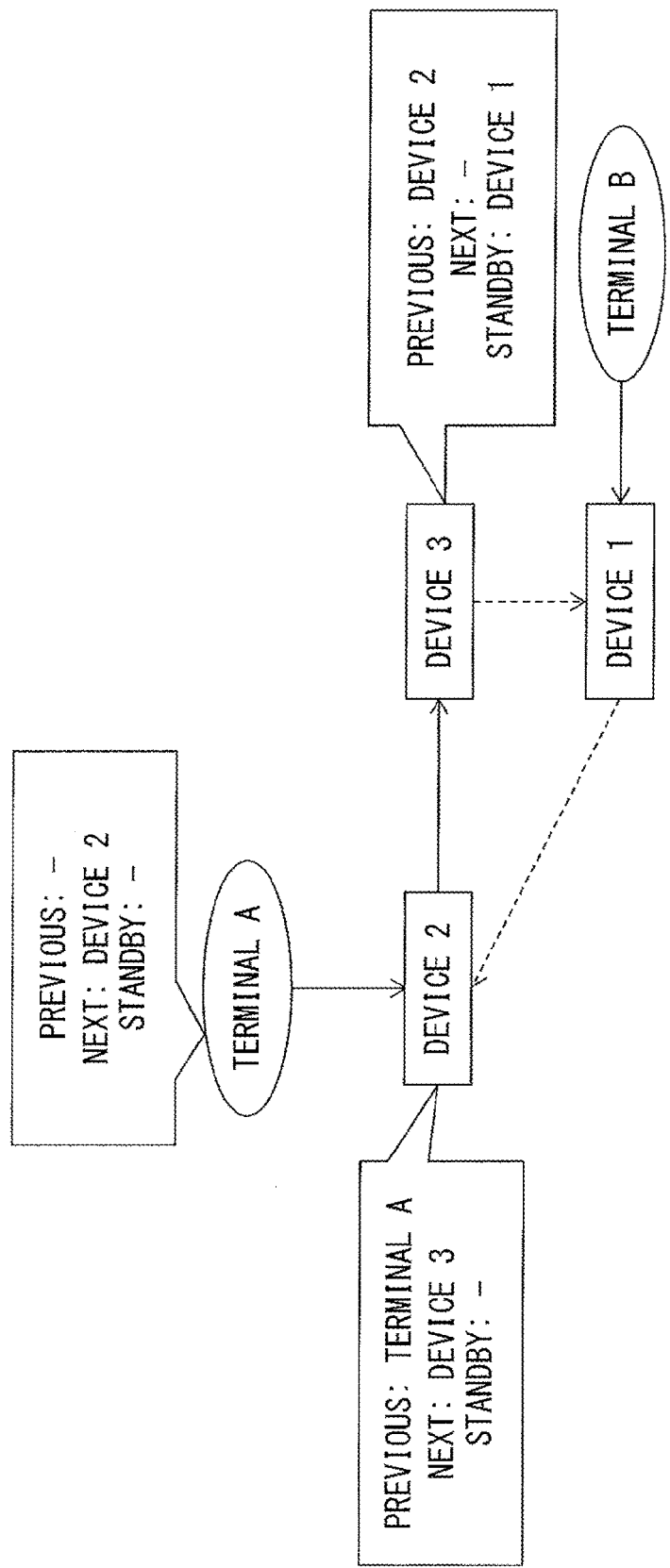
F I G. 12

PREVIOUS/NEXT/STANDBY NODE INFORMATION

| PREVIOUS NODE URI | NEXT NODE URI | STANDBY NODE URI |
|---|---|---|
| device001 | device003 | device004, device005 |

F I G. 13

DEADLOCK DETECTION MESSAGE

| MESSAGE ISSUER URI | MESSAGE TRANSMITTER URI | MESSAGE TRANSMISSION DESTINATION URI | ARRIVED NODE FIELD/PRIORITY INFORMATION |
|---|---|---|---|
| device001 | device005 | device006 | (device002, appA, 2013/11/22 10:20:30), (device003, appB, 2013/11/22 15:20, 40) |

F I G. 1 4

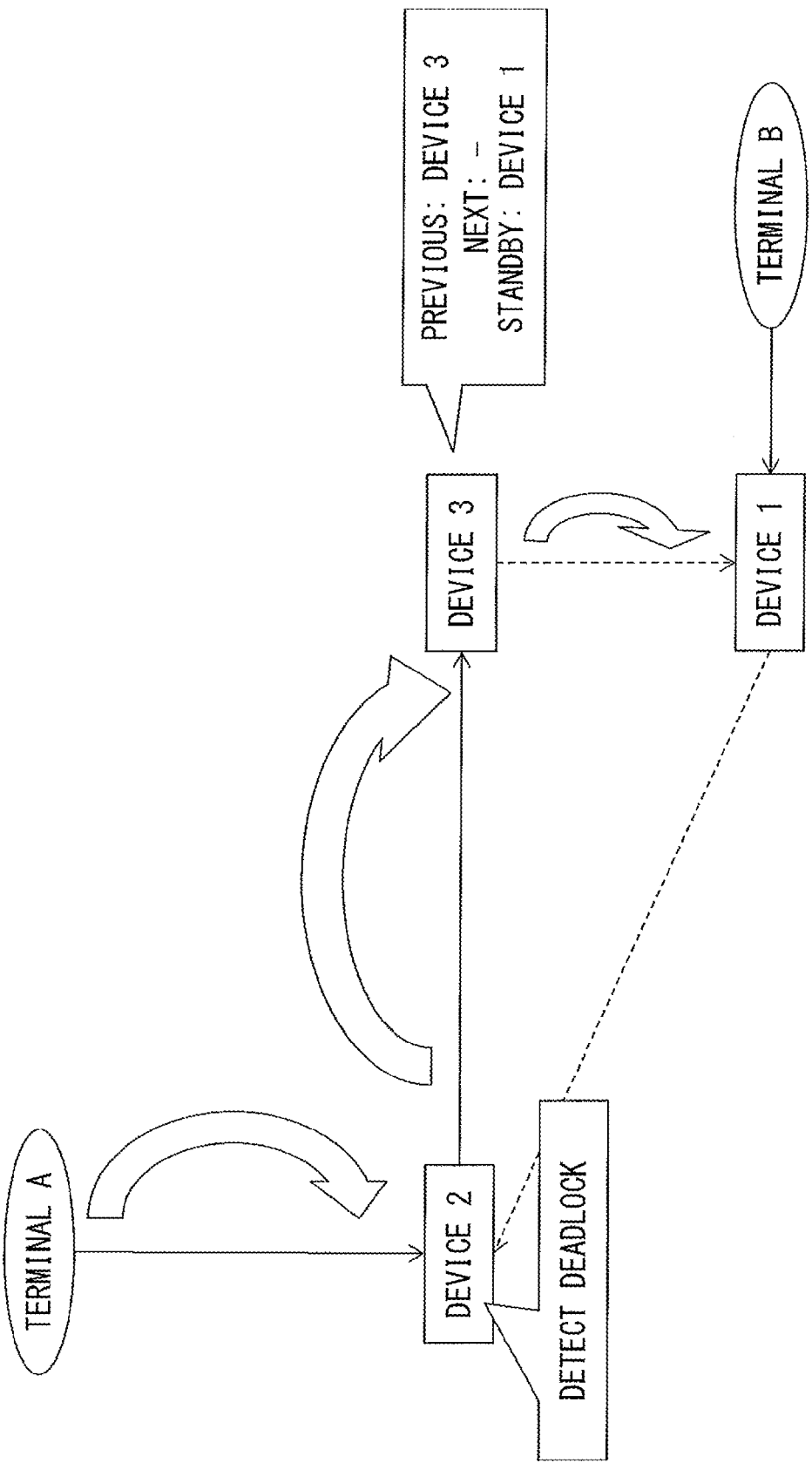
F I G. 17

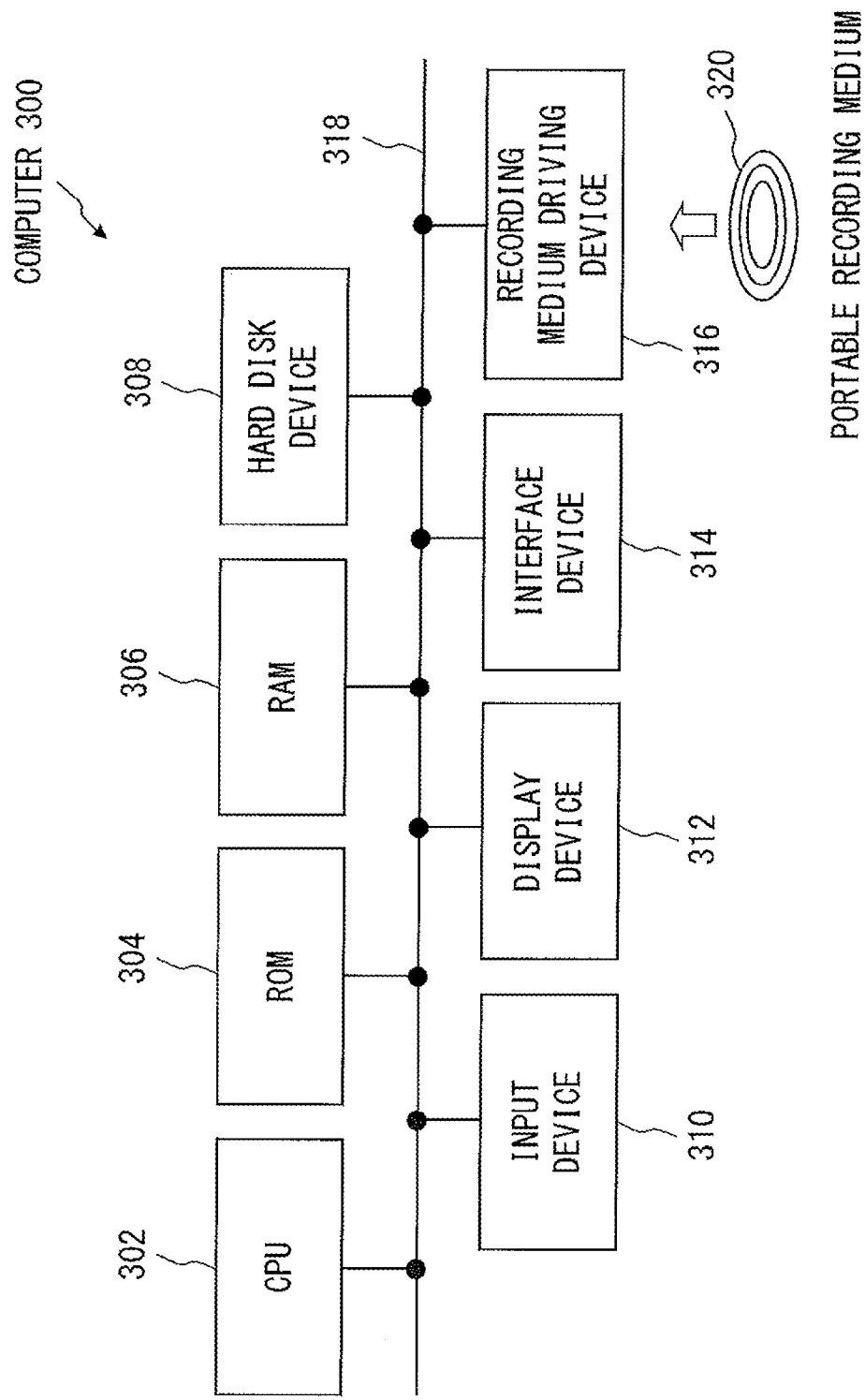
F I G. 2 0

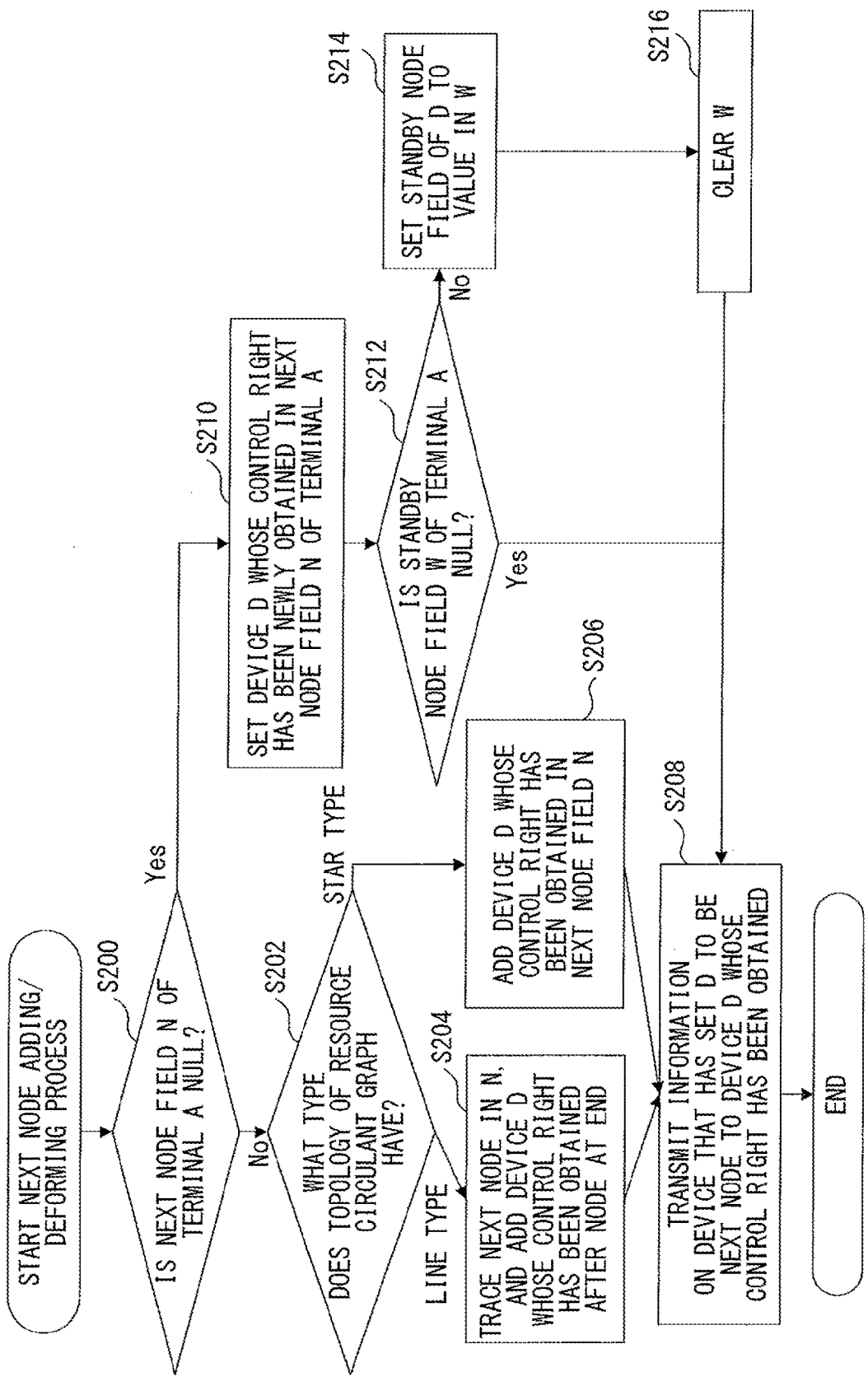
F I G. 22

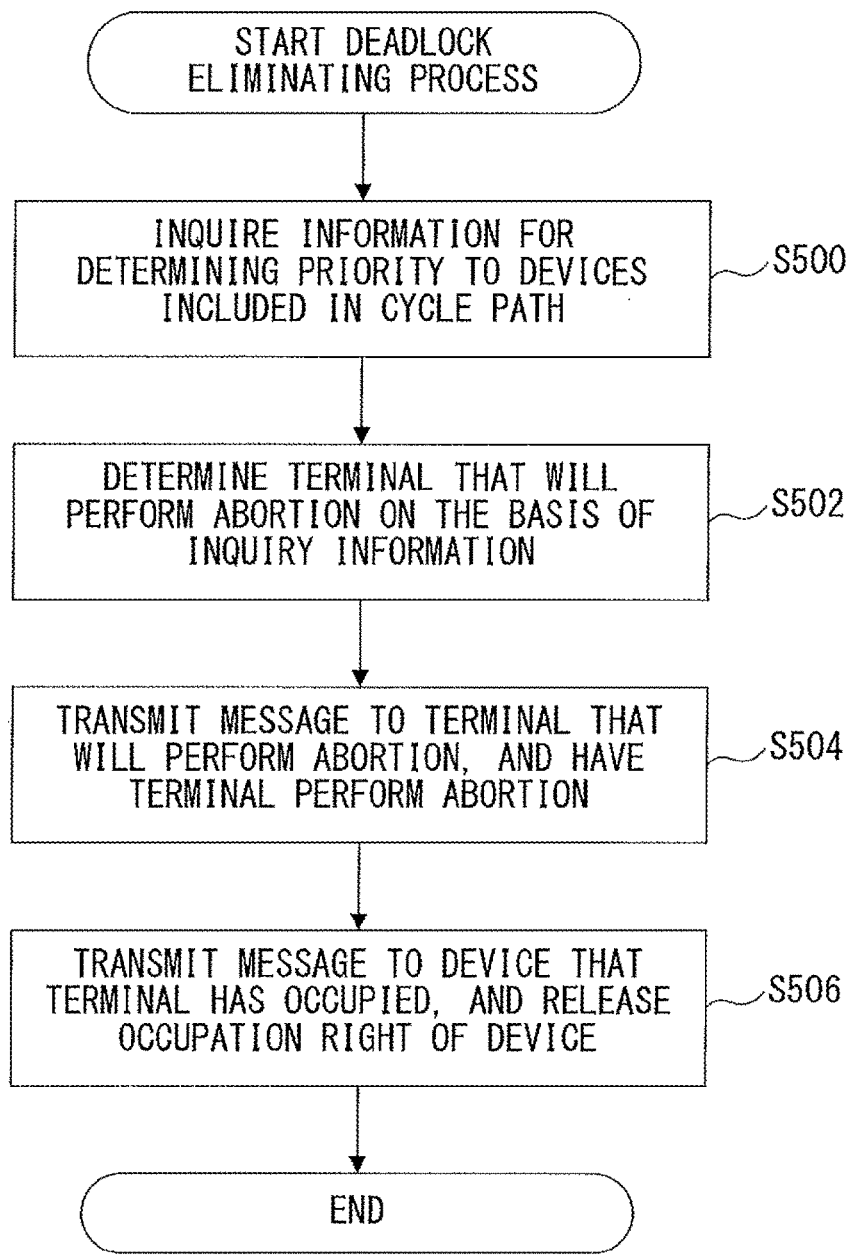
F I G. 2 5

DISTRIBUTED DATA PROCESSING DEVICE AND DISTRIBUTED DATA PROCESSING METHOD

CROSS-REFERENCE TO RELATED APPLICATION

This application is based upon and claims the benefit of priority of the prior Japanese Patent Application No. 2014-72194, filed on Mar. 31, 2014, the entire contents of which are incorporated herein by reference.

FIELD

The embodiments discussed herein are related to a distributed data processing device and a distributed data processing method.

BACKGROUND

As network equipment and mobile terminals have become popular, a technology for controlling a device that can be controlled via a network from a mobile terminal has attracted attention. As an example, electronic boards that are capable of controlling the operation of switching on and off a device such as a bulb via a network, projectors that can be controlled via a network and the like have become widely used.

These pieces of equipment can be used in a generally called "distributed system", that is, a system that enables controlling a device that can be controlled via a network from a mobile terminal. The distributed system generally has a configuration in which a controlled device has a state and the state that the controlled device has is changed in response to a message transmitted from the mobile terminal. In addition, in order to prevent a state from being changed unintentionally by a plurality of terminals, the controlled device manages information on a mobile terminal that is a control source, and issues, to the mobile terminal, a control right of the controlled device or a control right waiting report in response to a control right request from the mobile terminal. On the conditions above, a mobile terminal does not need to continuously monitor a device to be controlled, and a network load on the mobile terminal can be reduced. In addition, because it is assumed that there are many mobile terminals and controlled devices in a system, it is unrealistic to have all controlling/controlled relations. Therefore, the respective mobile terminals and controlled devices may have only information on controlled devices that the respective mobile terminals control and information on mobile terminals by which the respective controlled devices are controlled, respectively.

As the distributed system described above, a distributed system is known that enables detecting deadlocks between transactions (global transactions) that are generated so as to stretch over a plurality of resource managers that perform database access or the like (for example, Patent Document 1). In the distributed system above, as an example, a transaction manager that collectively manages transactions may detect deadlocks that are generated between a plurality of transactions so as to stretch over a plurality of resource managers and that result from a wait-for relation relating to occupation of software resources.

A method is also known for detecting deadlocks effectively in a multi-task system in which a plurality of tasks are executed in parallel and which resource each of the tasks occupies is managed (for example, Patent Document 2). In this multi-task system, a wait-for management table is provided so as to register a "wait-for relation" of each of the tasks, and deadlocks can be detected from the wait-for relation.

A distributed system is also known in which deadlocks are detected and eliminated on the basis of individual locks in a process (for example, Patent Document 3). In this system, a distributed transaction manager stores a wait-for graph that includes nodes representing transactions and edges representing dependencies between the transactions, and propagates probes through the wait-for graph so as to detect cyclic dependencies that indicate deadlock dependencies.

As a method for detecting and eliminating deadlocks, a time-out system is known by which an occupation right of a controlled device is forcibly released when a time to wait for the occupation right of the controlled device exceeds a prescribed time period (for example, Patent Document 2). As a deadlock detecting system by which time-out is not performed, a system is known for eliminating deadlocks using a resource circulant graph (for example, Non-Patent Document 1). When deadlock detection is performed using a resource circulant graph, all control relations between terminals and controlled devices need to be stored, and therefore it is difficult to use the resource circulant graph as is, in a distributed system. However, the Chandy-Misra-Haas algorithm is known in which, even when pieces of information are stored while being distributed to terminals and controlled devices, deadlock detection is performed similarly to a resource circulant graph by transmitting messages to destinations that the respective terminals and controlled devices store and by detecting whether the messages returns (for example, Non-Patent Document 2).

[Patent Document 1] Japanese Laid-open Patent Publication No. 8-137707

[Patent Document 2] Japanese Laid-open Patent Publication No. 6-337798

[Patent Document 3] Japanese Laid-open Patent Publication No. 6-214967

[Non-Patent Document 1] R. Holt, "Some dead lock properties of computer systems", ACM Computing Surveys, vol. 4, pp. 179-196, 1972

[Non-Patent Document 2] K. Chandy, J. Misra, L. Haas, "Distributed deadlock detection", ACM Trans. Computer Systems, vol. 1, pp. 144-156, 1983

Accordingly, it is an object in one aspect of the embodiments to provide a distributed data processing device, a distributed data processing method, and a distributed data processing program that are capable of detecting deadlocks even when communication between terminals and controlled devices is unavailable.

SUMMARY

According to an aspect of the embodiments, a distributed data processing device is disclosed that is one of a plurality of terminals or one of a plurality of controlled devices in a system including the plurality of terminals and the plurality of controlled devices that give control rights to control operations of the plurality of controlled devices to the plurality of terminals, respectively such that the operations are controlled. The distributed data processing device includes a processor configured to receive a deadlock detection message that is transferred between the plurality of controlled devices so as to be transferred between a plurality of nodes along a first link and a second link in a resource circulant graph that is configured by combining the plurality of nodes, which respectively correspond to the plurality of controlled devices, using the first link and the second link, the first link extending from a first node corresponding to a first controlled device whose control right a first terminal has to a second node corresponding to a second controlled device whose control right the first terminal has, the second link extending from a third node corresponding to a third controlled device whose control right a second terminal has to a fourth node corresponding to a fourth controlled device whose control right the second terminal waits to be given, and to determine whether a deadlock has occurred on the basis of a history of the deadlock detection message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a resource circulant graph having a line-type topology.

FIG. 12 illustrates an example of a resource circulant graph according to the embodiment.

FIG. 13 illustrates an example of previous/next/standby node information.

FIG. 14 illustrates an example of a deadlock detection message.

FIG. 17 is a diagram explaining an example of deadlock detection using a resource circulant graph according to the embodiment.

FIG. 20 illustrates an example of a configuration of a distributed data processing device according to the embodiment.

FIG. 22 illustrates an example of a flow of a next node adding/deforming process on a terminal side.

FIG. 25 illustrates an example of a flow of a deadlock eliminating process using a resource circulant graph according to the embodiment.

DESCRIPTION OF EMBODIMENTS

However, in the Chandy-Misra-Haas algorithm, it is assumed that communication between terminals and controlled devices is available at all times, and therefore there is a problem wherein deadlocks are not detected normally in some cases when communication between terminals and controlled devices is unavailable.

With reference to the drawings, a distributed data processing device, a distributed data processing method, and a distributed data processing program according to the embodiment are described below.

Figure 1:
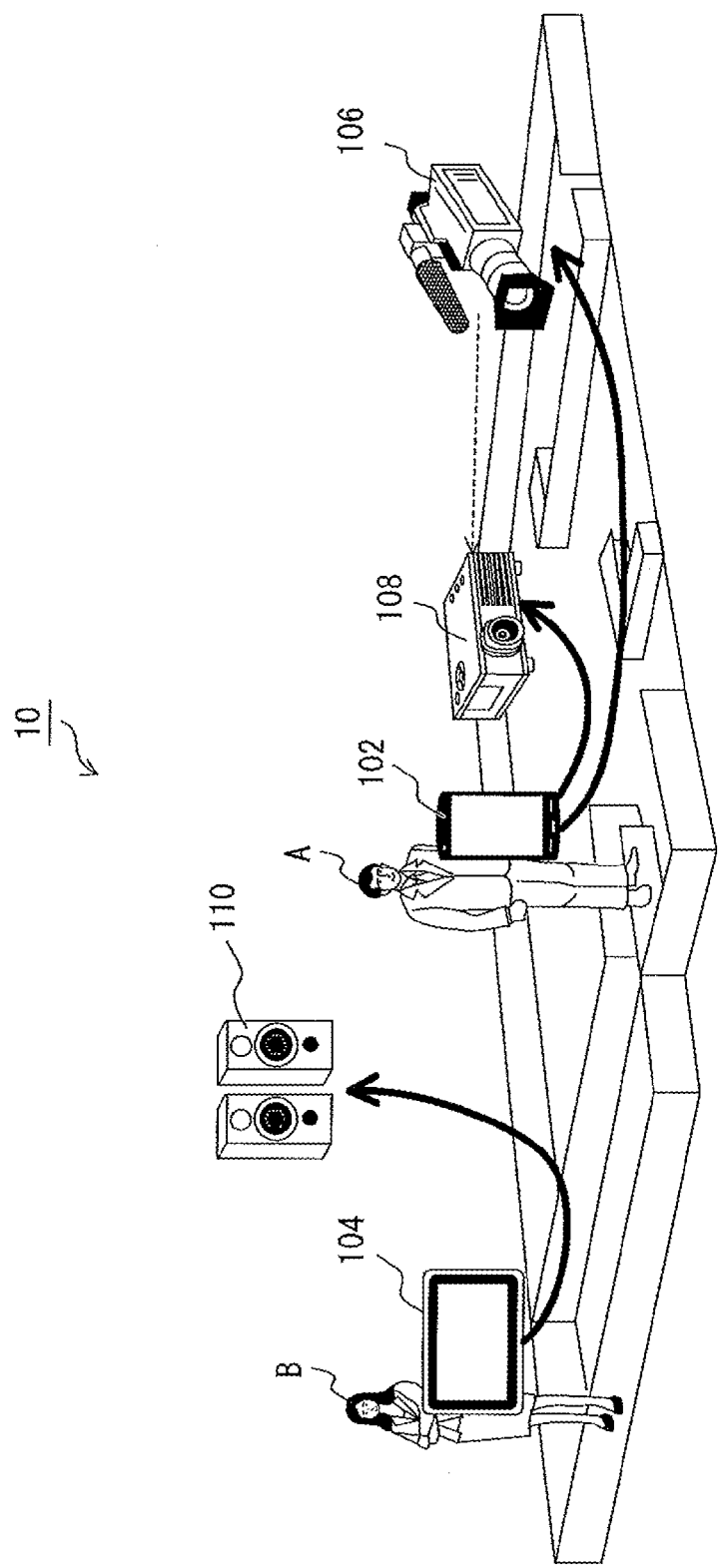
FIG. 1 illustrates an example of a system in which pieces of controlled equipment are operated from terminals.

FIG. 1 illustrates an example of a system in which pieces of controlled equipment are operated from terminals. As network equipment and mobile terminals have become popular, a technology for controlling a device that can be controlled via a network from a mobile terminal has attracted attention. As an example, electronic boards that are capable of controlling the operation of switching on and off a device such as a bulb via a network, projectors that can be controlled via a network and the like are known.

A mobile terminal that controls a device that can be controlled via a network or a mobile computer such as a tablet terminal is simply referred to as a "terminal" in some cases. Equipment that can be controlled via a network is referred to as "controlled equipment" or a "controlled device" in some cases. Further, a terminal or a controlled device is simply referred to as a "device" in some cases.

In addition, a state in which a terminal can control a controlled device via a network is sometimes referred to as "a terminal has a control right of a controlled device". This state is also referred to as "a terminal has an occupation right to occupy a controlled device". These expressions are mutually exchangeable. Here, a control right or an occupation right may be given from a controlled device to a terminal in response to a request from the terminal to the controlled device. Further, a state in which a terminal is waiting to be given a control right or an occupation right from a controlled device is sometimes referred to as a "control right waiting" state or a "occupation right waiting" state.

Hereinafter, the terms "control right" and "occupation right" are mutually exchangeable.

FIG. 1 illustrates a system 10 in which pieces of electronic equipment 106, 108, and 110 that are provided in a fixed place such as a conference room are operated using mobile computers 102 and 104 such as a mobile terminal or a tablet terminal that operators A and B possess. In FIG. 1, the operator A may simultaneously operate a camera 106 and a projector 108 using a mobile terminal 102 that the operator A possesses so as to output, from the projector 108, an image captured by the camera 106. In addition, the operator B may have audio equipment 110 repeatedly play the same tune from among tunes stored in a tablet 104, using the tablet 104 that the operator B possesses.

In the system 10 in which a device that can be controlled via a network, such as the camera 106, the projector 108, or the audio equipment 110, is controlled from the mobile computer 102 or 104, a controlled device generally has a state. As an example, the projector 108 may have a projecting state, a non-projecting state or the like. In addition, the audio equipment 110 may have a continuous state such as the sound volume.

The system 10 illustrated in FIG. 1 has a configuration in which a state that a controlled device has is changed in response to a message transmitted from a terminal. As an example, in FIG. 1, the operator A can operate the mobile computer 102 such as a smartphone such that the projector 108 outputs an image captured by the camera 106, or displays a setting screen after disconnecting the camera 106. In addition, the operator B can perform operation so as to change tunes played from the audio equipment 110 such as a speaker.

In addition, in order to prevent a plurality of terminals from changing a state unintentionally, a controlled device manages information on a terminal that is a control source. Further, the controlled device issues, to the terminal, a control right of the controlled device or a control right waiting report in response to a control right request from the terminal. As an example, in FIG. 1, the camera 106 and the projector 108 are operated by the terminal 102 possessed by the operator A, and when the operator A newly wishes to operate a speaker 110, the operator A receives a control right waiting message from the speaker 110, and waits for a control right of the audio equipment 110 until the operator B releases the control right of the audio equipment 110.

In the configuration above, a terminal does not need to constantly monitor a controlled device, which is a control destination, and a network load on the terminal can be reduced. As an example, a terminal 104 of the operator B does not need to constantly communicate with the audio equipment 110, and may communicate with the audio equipment only when performing operation of changing tunes.

In addition, it is assumed that there are many terminals and controlled devices in a system, and therefore it is unrealistic to have all controlling/controlled relations, and the respective terminals and controlled devices may have only information on controlled devices that the respective terminals control and information on terminals by which the respective controlled devices are controlled, respectively. As an example, a terminal 102 of the operator A stores control right information of the projector 108 and the camera 106, but does not store information that the audio equipment 110 is operated by the operator B.

The system 10 as described above is generally referred to as a "distributed system" in some cases.

Figure 2:
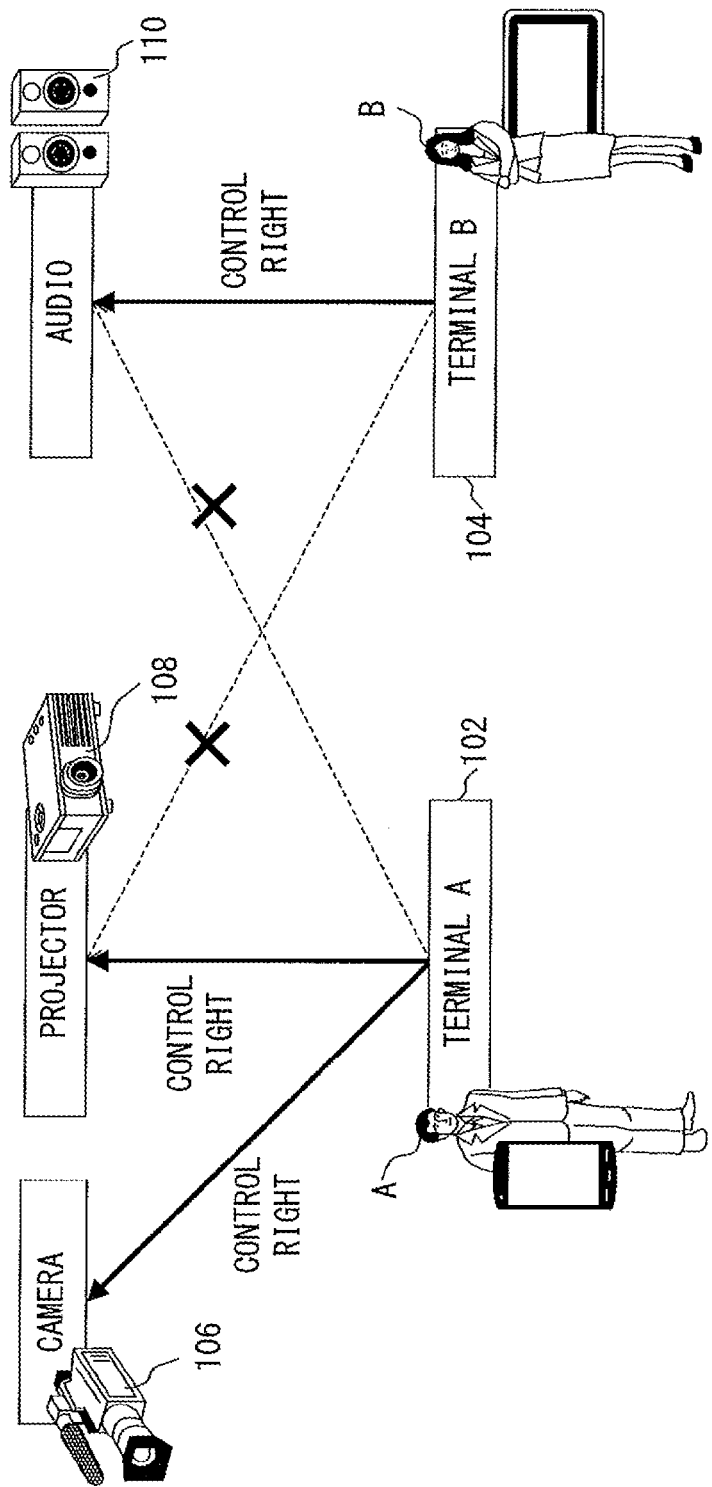
FIG. 2 is a diagram explaining a deadlock between terminals.

FIG. 2 is a diagram explaining a deadlock between terminals.

When equipment that can be controlled via a network is controlled from a mobile terminal, deadlock elimination between terminals is indispensable for realizing a stable operation of an application. A deadlock is control contention that occurs between terminals, and the deadlock occurs when a plurality of terminals control plural pieces of equipment.

As an example, a situation is considered in which application that both the projector 108 and the audio equipment 110 need is being executed on a terminal A (102) and a terminal B (104), as illustrated in FIG. 2. In the situation above, the terminal A (102) first obtains a control right of the projector 108, and the terminal B (104) first obtains a control right of the audio equipment 110. When the terminal A (102) wishes to obtain the control right of the audio equipment 110 and the terminal B (104) wishes to obtain the control right of the projector 108, the audio equipment 110 and the projector 108 have been occupied, and therefore both the terminal A and the terminal B enter into a control right waiting state. However, both the terminal A (102) and the terminal B (104) are waiting for control rights while one terminal has a control right that the other terminal desires, and therefore a process does not proceed, and contention is not resolved even after time elapses. As described above, a state in which processes generate contention and the processes do not proceed means a deadlock.

Because deadlocks are not eliminated automatically, the deadlocks need to be detected and eliminated by any means.

An example of a means for simply detecting and eliminating deadlocks is a time-out system in which an occupation right of a controlled device is forcibly released when an occupation right waiting time of the controlled device exceeds a prescribed time period. However, in the time-out system, it is difficult to set a time-out time in order to prevent erroneously releasing a control right or waiting for a control right for a long time. In addition, polling between a terminal and a controlled device is needed for detecting release of a control right. Therefore, there is a problem wherein power consumption is increased, and the time-out system is inappropriate to be executed, particularly, on a mobile terminal.

As a deadlock detecting system in which time-out is not performed, a system for eliminating deadlocks using a resource circulant graph is known.

As a deadlock detecting method, a method using a wait-for graph is known. In the method using await-for graph, deadlocks are detected by detecting cyclic paths on a graph in which processes are expressed by nodes, and therefore deadlocks are detected in the same principle as that of the resource circulant graph.

Figure 3A:
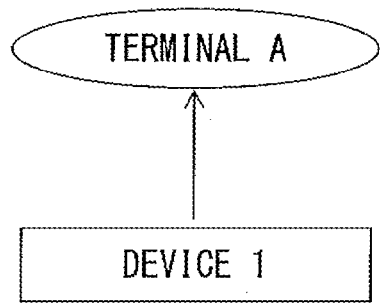
FIG. 3A illustrates an example of a notation of a resource circulant graph in a comparative example.
Figure 3B:
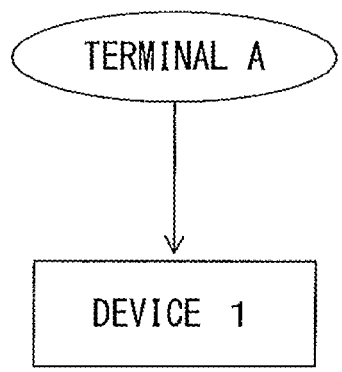
FIG. 3B illustrates another example of a notation of a resource circulant graph in a comparative example.

FIG. 3A illustrates an example of a notation of a resource circulant graph in a comparative example. FIG. 3B illustrates another example of a notation of a resource circulant graph in a comparative example.

In FIGS. 3A and 3B, it is assumed that terminals and controlled devices are expressed by nodes, that a device in a circle expresses a terminal, and that a device in a square expresses a controlled device. Further, a link in a graph expresses a control relation or a control waiting relation between a terminal and a controlled device.

In the example illustrated in FIG. 3A, an arrow is drawn from device 1 to terminal A. As illustrated in this example, a link extending from a controlled device to a terminal sometimes indicates that the terminal controls the controlled device.

In the example illustrated in FIG. 3B, an arrow is drawn from terminal A to device 1. As illustrated in this example, a link extending from a terminal to a controlled device sometimes indicates that terminal A is in a state of waiting for a control right of controlled device 1.

Here, it is known that a cycle path is generated on a resource circulant graph when a deadlock between terminals occurs, and a deadlock can be detected by examining whether a cycle path is generated on a resource circulant graph. This is described with reference to FIG. 4.

Figure 4:
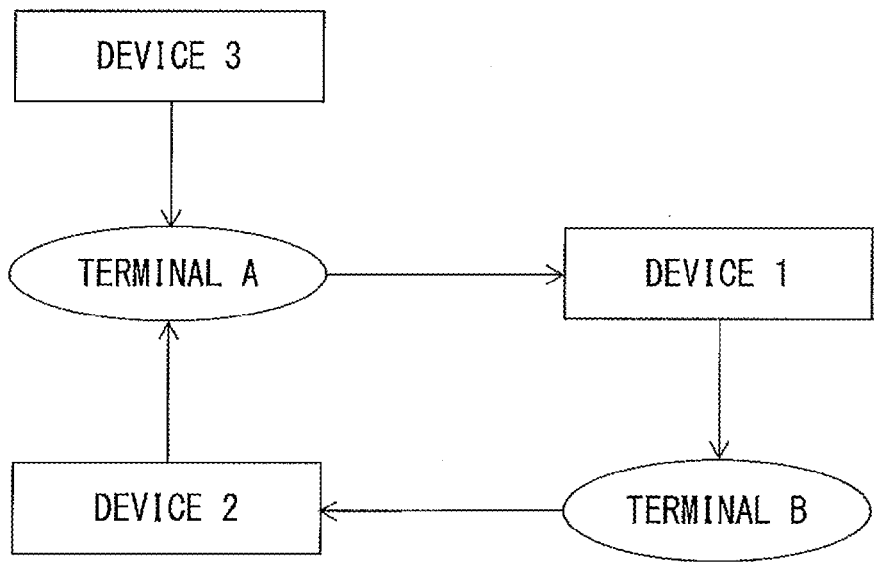
FIG. 4 is a diagram explaining deadlock detection using a resource circulant graph.

FIG. 4 is a diagram explaining deadlock detection using a resource circulant graph.

As an example, in the example illustrated in FIG. 4, a cycle path "terminal A→device 1→terminal B→device 2→terminal A" is generated. Therefore, the occurrence of a deadlock can be detected.

When deadlock detection is performed using a resource circulant graph, all control relations between terminals and controlled devices need to be stored, and therefore it is difficult to use the resource circulant graph as is in a distributed system. However, a method in which, even when pieces of information are stored while being distributed to the terminals and the controlled devices, deadlock detection is performed similarly to the resource circulant graph by transmitting messages to destinations that the respective terminals and controlled devices store and by detecting whether the messages returns, e.g., the Chandy-Misra-Haas algorithm, is known.

Figure 5:
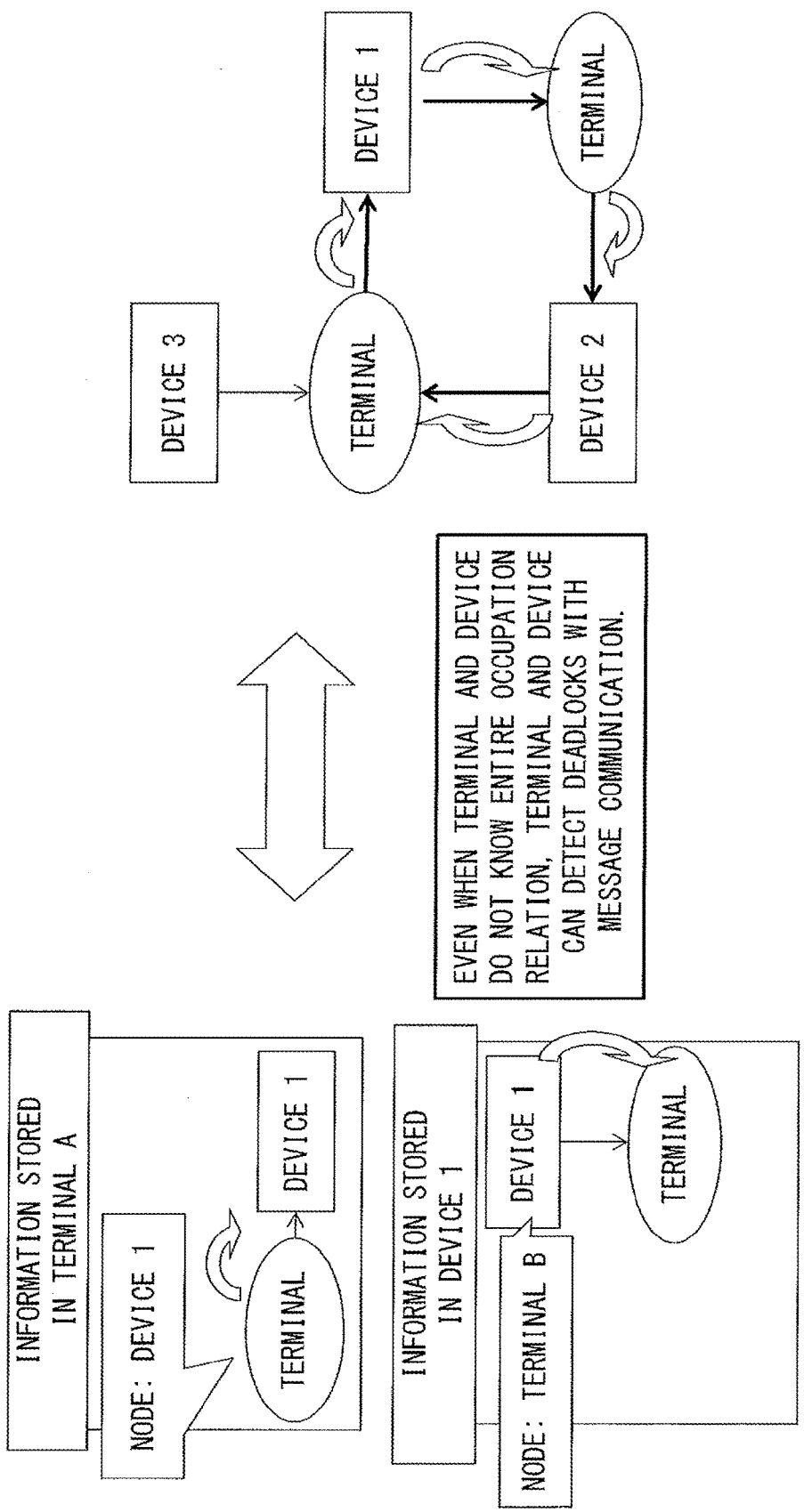
FIG. 5 is a diagram explaining deadlock detection in a distributed system.

FIG. 5 is a diagram explaining deadlock detection in a distributed system.

In the example illustrated in FIG. 5, a terminal stores information of a controlled device (device 1) whose control right the terminal waits for, and the controlled device (device 1) stores information of a terminal that has a control right of the controlled device. In detecting a deadlock, the terminal transmits a message, a terminal or a controlled device that has received the message transmits the message to a terminal or a controlled device whose information the terminal or the controlled device has stored, and it is monitored whether the same message arrives again at the same terminal or controlled device. Here, a situation in which the same message arrives again at the terminal and the controlled device means that a cycle path has been generated, and therefore deadlocks can be detected by monitoring whether the same message arrives.

Figure 6:
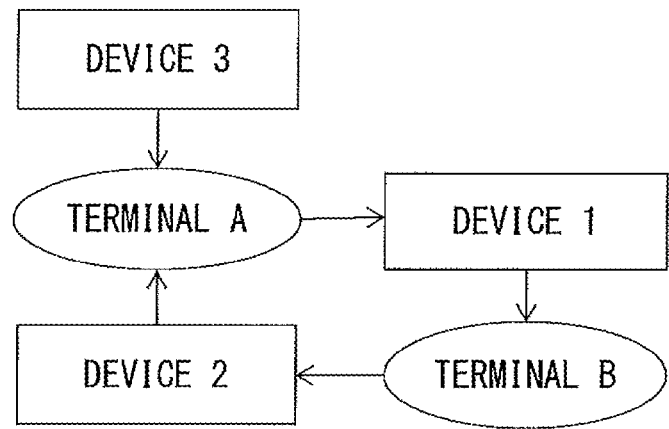
FIG. 6 illustrates an example of a resource circulant graph.

FIG. 6 illustrates an example of a resource circulant graph.

In the example illustrated in FIG. 6, device 2 and device 3 are controlled by terminal A. In addition, device 1 is controlled by terminal B. Further, terminal A is in a state of waiting for a control right of device 1, and terminal B is in a state of waiting for a control right of device 2.

Figure 7:
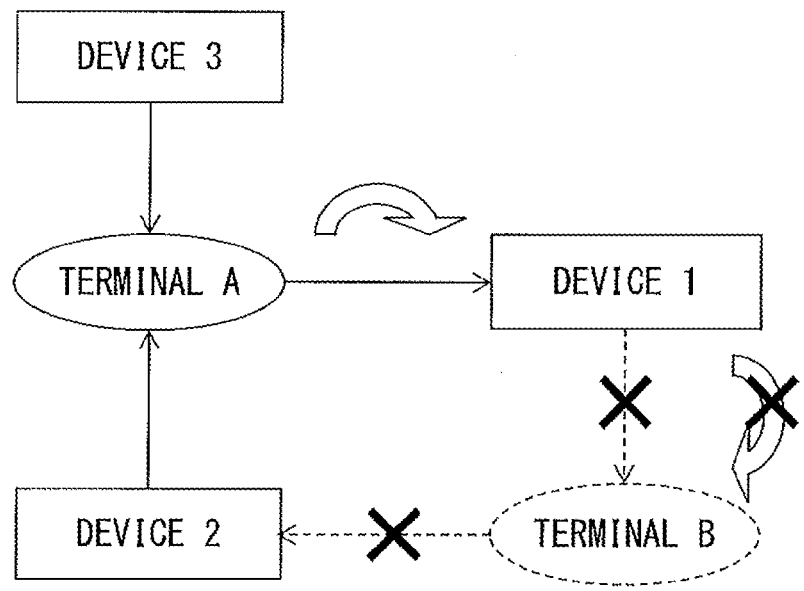
FIG. 7 illustrates an example of deadlock detection by the Chandy-Misra-Haas algorithm.

FIG. 7 illustrates an example of deadlock detection by the Chandy-Misra-Haas algorithm.

In the Chandy-Misra-Haas algorithm, it is assumed that a terminal and a controlled device can communicate with each other at all times, and therefore when communication between a terminal and a controlled device are unavailable, deadlocks sometimes fail to be detected normally.

When terminal B is in a sleep state in a condition of an occupation relation in the example illustrated in FIG. 7, a message transmitted from terminal A is not transferred to terminal 2 or other equipment that follows, and therefore the message does not return to terminal A. Accordingly, when a deadlock actually occurs but communication with a terminal is unavailable, the deadlock is not correctly detected in the Chandy-Misra-Haas algorithm in some cases. Further, when a deadlock is detected, the deadlock is not eliminated. Therefore, contention between terminals is not resolved, and operation of a system may be impeded. Particularly in a mobile terminal, temporal interruption of communication due to sleep, movement or the like occurs many times, and therefore the assumption in the Chandy-Misra-Haas algorithm is not satisfied in many cases.

Generally, communication with a controlled device is available in a lager number of cases than communication with a terminal. In view of this, deadlocks are detected using a resource circulant graph that is configured so as to include only controlled devices in a cycle path. A distributed data processing device, a distributed data processing method, and a distributed data processing program are described that can detect deadlocks in the configuration above even when communication between a terminal and a controlled device is unavailable.

The distributed data processing device, the distributed data processing method, and the distributed data processing program as disclosed below have the following characteristics:

(C1) A resource circulant graph is configured so as to include only controlled devices in a cycle path.

(C2) Deadlocks are detected even when communication with a terminal is temporarily unavailable, using the resource circulant graph that includes only controlled devices in a cycle path.

(C3) Deadlocks are eliminated even when communication with a terminal is temporarily unavailable, using the resource circulant graph that includes only controlled devices in a cycle path.

(C4) Deadlock detection and elimination are performed simultaneously.

<Distributed Data Processing Device>

Figure 8:
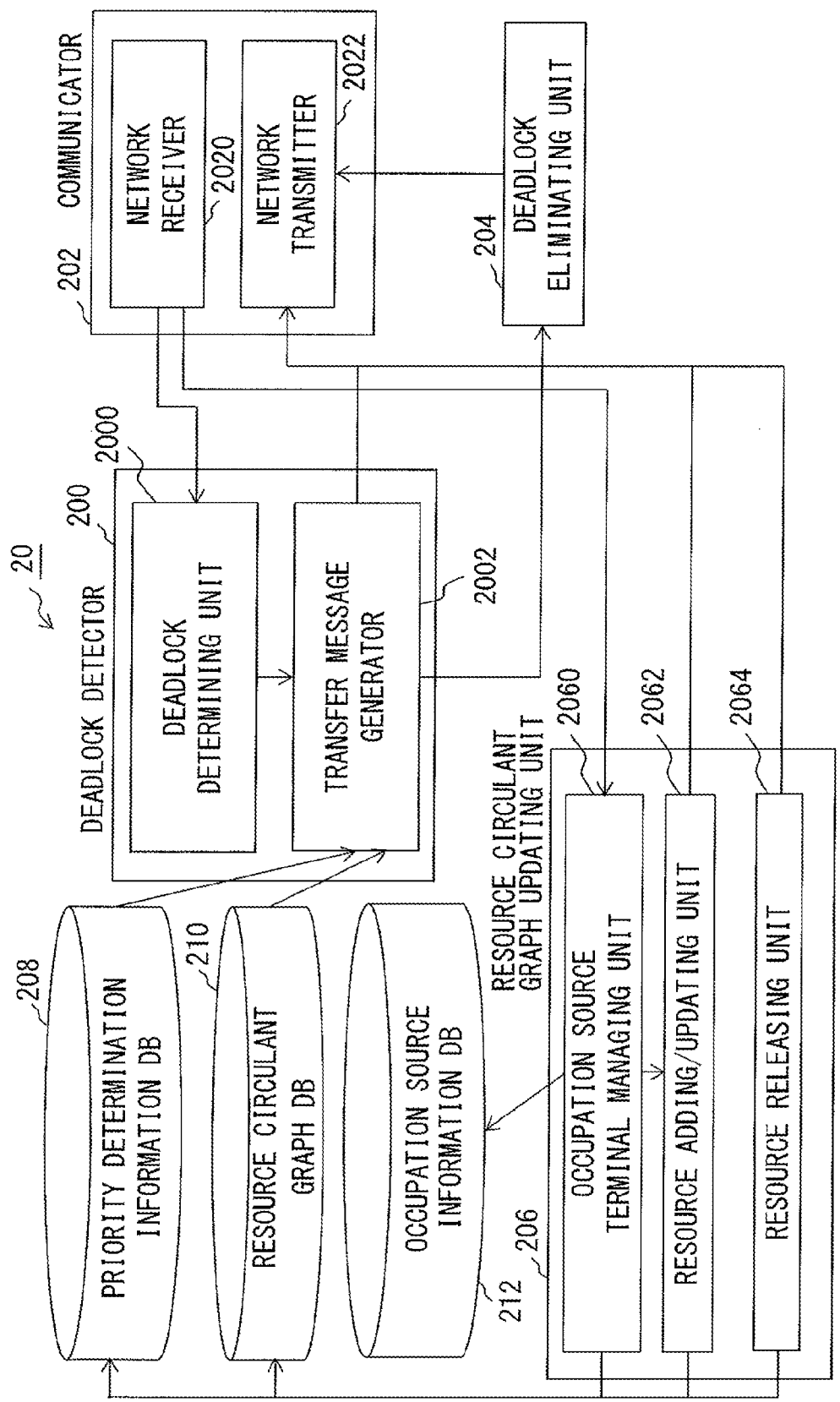
FIG. 8 illustrates an example of a functional block of a distributed data processing device according to the embodiment.

FIG. 8 illustrates an example of a functional block of a distributed data processing device 20 according to the embodiment. The distributed data processing device 20 may be a portion of a terminal or a controlled device.

The distributed data processing device 20 may include a deadlock detector 200, a communicator 202, a deadlock eliminating unit 204, a resource circulant graph updating unit 206, a priority determination information database (DB) 208, a resource circulant graph DB 210, and an occupation source information DB 212. The priority determination information database (DB) 208, the resource circulant graph DB 210, and the occupation source information DB 212 are sometimes collectively referred to as a "storage unit".

The deadlock detector 200 includes a deadlock determining unit 2000 and a transfer message generator 2002. The deadlock determining unit 2000 may detect a circulation of a message so as to determine whether a deadlock has occurred. The transfer message generator 2002 may generate messages including information on a uniform resource identifier (URI), a stored priority or the like.

The communicator 202 includes a network receiver 2020 and a network transmitter 2022. The network transmitter 2022 may transmit the messages generated by the transfer message generator 2002 of the deadlock detector 200. The network receiver 2020 may receive messages from a network, and may transmit the messages to the deadlock determining unit 2000 of the deadlock detector 200.

The resource circulant graph updating unit 206 may include an occupation source terminal managing unit 2060, a resource adding/updating unit 2062, and a resource releasing unit 2064. The occupation source terminal managing unit 2060 manages information on a terminal that occupies the distributed data processing device 20. When this happens, the occupation source terminal managing unit 2060 may use the occupation source information DB 212. The resource adding/updating unit 2062 may add or update a previous node, a next node, or a standby node in a resource circulant graph when a resource is secured. The resource releasing unit 2064 may update a previous node, a next node, or a standby node in a resource circulant graph when a resource is released.

Information for determining a priority at the time of releasing an occupation of a controlled device may be stored in the priority determination information DB 208. Data stored in the priority determination information DB 208 may be used for generating a message in the transfer message generator 2002.

In the resource circulant graph DB 210, information on a previous node, a next node, and a standby node that is given to a controlled device including the distributed data processing device 20 in a resource circulant graph may be stored. Data stored in the resource circulant graph DB 210 may be used for generating a message in the transfer message generator 2002.

The deadlock eliminating unit 204 may determine a terminal that releases an occupation, may generate an occupation forcible release message for deadlock elimination, and may transmit the occupation forcible release message to the network transmitter 2011.

As an example, the occupation forcible release message may include a command for causing a device that receives the occupation forcible release message to stop a report of giving an occupation right in response to a control right request from a terminal.

As described above, the distributed data processing device 20 is one of a plurality of terminals or one of a plurality of controlled devices in a system that includes the plurality of terminals, and the plurality of controlled devices that give control rights to control operations of the plurality of controlled devices to the plurality of terminals, respectively such that the operations are controlled.

The network receiver 2022 of the distributed data processing device 20 may receive a deadlock detection message that is transferred between the plurality of controlled devices so as to be transferred between a plurality of nodes along a first link and a second link in a resource circulant graph that is configured by combining the plurality of nodes, which respectively correspond to the plurality of controlled devices, using the first link and the second link, the first link extending from a first node that corresponds to a first controlled device whose control right a first terminal has to a second node that corresponds to a second controlled device whose control right the first terminal has, the second link extending from a third node that corresponds to a third controlled device whose control right a second terminal has to a fourth node that corresponds to a fourth controlled device whose control right the second terminal waits to be given.

The deadlock determining unit 2000 of the distributed data processing device 20 may determine whether a deadlock has occurred on the basis of a history of the deadlock detection message.

In addition, the deadlock determining unit 2000 of the distributed data processing device 20 may determine that a deadlock has occurred, when the deadlock detection message reaches one of the plurality of controlled devices multiple times.

The distributed data processing device 20 may further include a storage unit 210 that stores pieces of information on a previous node, a next node, and a standby node. Here, the "previous node" has been set so as to be one of the plurality of controlled devices that corresponds to a start point of the first link when the distributed data processing device 20 is one of the plurality of controlled devices that corresponds to an end point of the first link. The "next node" has been set so as to be one of the plurality of controlled devices that corresponds to the end point of the first link when the distributed data processing device 20 is one of the plurality of controlled devices that corresponds to the start point of the first link. The "standby node" has been set so as to be one of the plurality of controlled devices that corresponds to an end point of the second link when the distributed data processing device 20 is one of the plurality of controlled devices that corresponds to a start point of the second link.

The respective nodes in the resource circulant graph may be provided with the pieces of information on the previous node, the next node, and the standby node that have been stored in the storage unit 210.

The distributed data processing device 20 may further include the deadlock eliminating unit 204 that transmits a report for eliminating a control right to one of the plurality of terminals that has a control right of one of the plurality of controlled devices included in the resource circulant graph, in order to eliminate a deadlock when the deadlock determining unit 2000 determines that the deadlock has occurred.

In addition, the deadlock detection message includes information on priorities of the plurality of controlled devices included in the resource circulant graph. The distributed data processing device 20 may include the deadlock eliminating unit 204 that transmits a report for eliminating a control right to one of the plurality of terminals that has a control right of one of the plurality of controlled devices included in the resource circulant graph on the basis of the priorities included in the deadlock detection message, in order to eliminate a deadlock when the deadlock determining unit 2000 determines that the deadlock has occurred.

<<Resource Circulant Graph>>

Figure 9A:
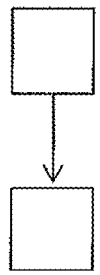
FIG. 9A illustrates an example of a notation of a resource circulant graph according to the embodiment.
Figure 9B:
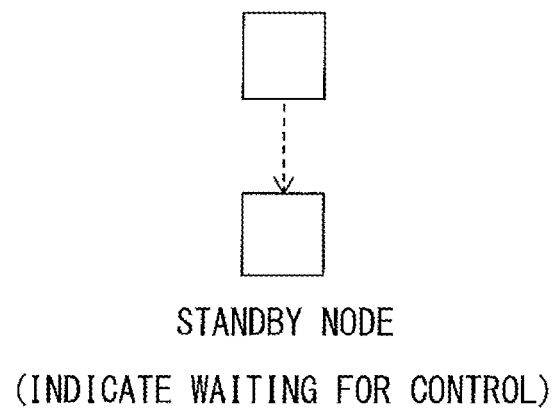
FIG. 9B illustrates another example of a notation of a resource circulant graph according to the embodiment.

FIG. 9A illustrates an example of a notation of a resource circulant graph according to the embodiment. FIG. 9B illustrates another example of a notation of a resource circulant graph according to the embodiment.

As illustrated in FIG. 9A, it is assumed that devices are controlled by the same terminal when the devices are connected by a solid arrow.

As illustrated in FIG. 9B, it is assumed that, when devices are connected by a dotted arrow, a terminal that controls a device that is expressed by a node at the start of the arrow (root node) is in a state of waiting for a control right over a device that is expressed by a node at the end of the arrow.

In the resource circulant graphs illustrated in FIG. 9A and FIG. 9B as described above, the following two types of information are stored in, for example, the resource circulant graph DB 210 of a terminal or a controlled device.

(G1) A link in the shape of a doubly-linked list that points to a terminal or a controlled device that is controlled by the same terminal (hereinafter, a front link is referred to as a "next node", and a rear link is referred to as a "previous node".)

(G2) A link that points to a controlled device whose control right a terminal that is a control source is waiting for (hereinafter referred to as a "standby node")

Accordingly, the resource circulant graph is configured such that a terminal and a controlled device that are connected as a previous node and a next node indicate a terminal and a controlled device that are connected to the same terminal via a link (first link), and that a root node in a subgraph in which nodes are connected as a previous node and a next node is a terminal that controls a device. In addition, in the resource circulant graph, a controlled device that a link of a standby node (second link) points to is a device whose control right a terminal that controls a device having a standby node, i.e., anode that a previous node points to (also referred to as a "root node"), is waiting for.

Figure 11:
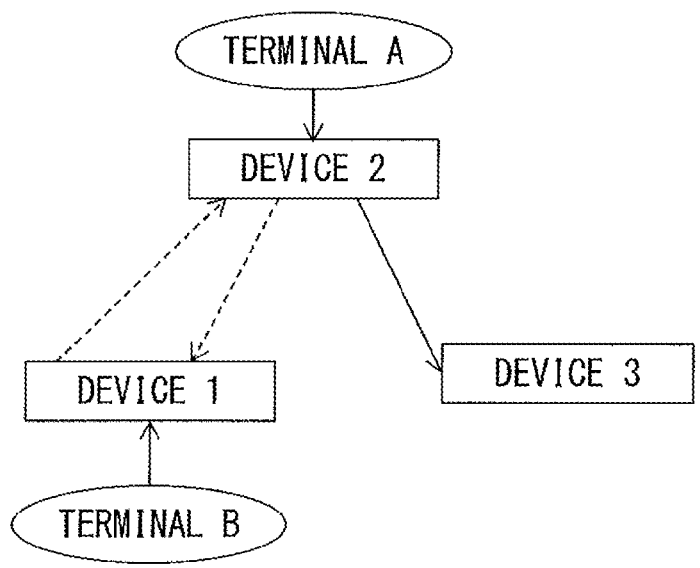
FIG. 11 illustrates an example of a resource circulant graph having a star-type topology.

FIG. 10 illustrates an example of a resource circulant graph having a line-type topology. FIG. 11 illustrates an example of a resource circulant graph having a star-type topology.

A line-type topology has a configuration in which only a node (leaf node) that has no slave nodes has a standby node and nodes connected as a previous node and a next node are connected linearly. In FIG. 10, device 1 and device 2 are standby nodes. Nodes that are connected via a previous node and a next node, i.e., device 2 and device 3, are connected linearly.

On the other hand, a star-type topology has a configuration in which only a slave node of a terminal has a standby node and a plurality of next nodes. Assuming that terminal A is a master node, device 2 is a slave node, and assuming that terminal B is a master node, device 1 is a slave node.

FIG. 12 illustrates an example of a resource circulant graph according to the embodiment.

In FIG. 12, terminal A has control rights of device 2 and device 3, and is waiting for a control right of device 1, and terminal B has a control right of device 1, and is waiting for a control right of device 2.

As illustrated in FIG. 12, the information "previous node: none; next node: device 2; standby node: none" is stored in, for example, the resource circulant graph DB 210 of terminal A.

In addition, the information "previous node: terminal A; next node: device 3; standby node: none" may be stored in terminal 2. This information may be stored in the resource circulant graph DB 210 of device 2. In addition, information on "terminal A", which has a control right of device 2, may be stored in the occupation source information DB 212 of device 2.

In addition, the information "previous node: device 2; next node: none; standby node: device 1" may be stored in device 3. This information may be stored in the resource circulant graph DB 210 of device 3.

FIG. 13 illustrates an example of previous/next/standby node information. This information may be stored in the resource circulant graph DB 210. As illustrated in FIG. 13, the previous/next/standby node information that is stored in the resource circulant graph DB 210 has three fields, i.e., previous node URI, next node URI, and standby node URI, and information that specifies a controlled device, such as "device001", may be stored in each of the fields. In addition, URIs of a plurality of devices may be stored in the field "standby node URI".

In addition, information on "terminal A", which has a control right of device 3, may be stored in the occupation source information DB 212 of device 3.

Nodes that are connected as a previous node and a next node indicate two devices that are controlled by the same terminal. In the example of FIG. 12, both device 2 and device 3 are controlled by terminal A.

In addition, a node connected as a standby node is a device whose control right a terminal that is to control the device is waiting for. The example of FIG. 12 illustrates that device 1, which is a standby node of device 3, is a device whose control right terminal A, which controls device 3, is waiting for.

As described above, a resource circulant graph that is configured so as to include only controlled devices in a cycle path can express a control/control-waiting relation. Because the resource circulant graph includes only controlled devices in a cycle path, the resource circulant graph can detect deadlocks even when communication with a terminal is temporarily unavailable.

It can be determined that a deadlock has occurred when a message that has been generated by the transfer message generator 2002 of the deadlock detector 200 of a controlled device and has been transmitted from the network transmitter 2022 of the communicator 202 is received by the network receiver 2020 of the communicator 202 of the controlled device, and is determined to be a message that the deadlock detector 200 has generated by the deadlock determining unit 2000 of the deadlock detector 200.

FIG. 14 illustrates an example of a deadlock detection message.

The message illustrated in FIG. 14 includes four fields, i.e., "message issuer URI", "message transmitter URI", "message transmission destination URI", and "arrived node field/priority information". However, the message does not always need to include priority information in "arrived node field/priority information" depending on an algorithm for eliminating deadlocks.

A URI that specifies a controlled device in which a deadlock detection message has been generated may be stored in the field "message issuer URI". A URI that specifies a controlled device that has linearly transmitted the message may be stored in the field "message transmitter URI". A URI that specifies a controlled device to which the message will be transmitted may be stored in the field "message transmission destination URI". Information on controlled devices that the message has arrived at and priorities may be stored in the field "arrived node field/priority information". Assuming that a controlled device that issues a control right request earlier has a higher priority, a priority may be expressed by a time at which the network receiver 2020 of the communicator 202 of an arrived controlled device issues a control right request from a terminal. In the example illustrated in FIG. 14, "(device 002, appA, 2013/11/22 10:20:30)" is stored in the field "arrived node field/priority information". This may indicate that the controlled device "device002", which is controlled by the terminal "appA", received a control right request at 10:20:30 on Nov. 22, 2013.

In the line-type topology, deadlocks can be detected when a message is transmitted to a next node and a standby node. On the other hand, in a start-type topology, a message needs to be transmitted to a previous node that has not received a message in addition to a next node and a standby node in order to detect deadlocks, and complicated operations are needed. Meanwhile, when device occupation is performed, in a line-type topology, an occupied device needs to be added after a leaf node in order to keep a configuration in which nodes are connected linearly, and when a terminal occupies K devices (K is an integer), communication of K orders (O(K)) is needed. On the other hand, in the star-type topology, a newly occupied device may be added after a slave node of a terminal, and therefore communication of one order (O(1)) is merely needed.

The resource circulant graph may be updated by the resource releasing unit 2064 of the resource circulant graph updating unit 206 when a terminal issues a request for a control right of a controlled device or when a terminal releases a control right.

Figure 15:
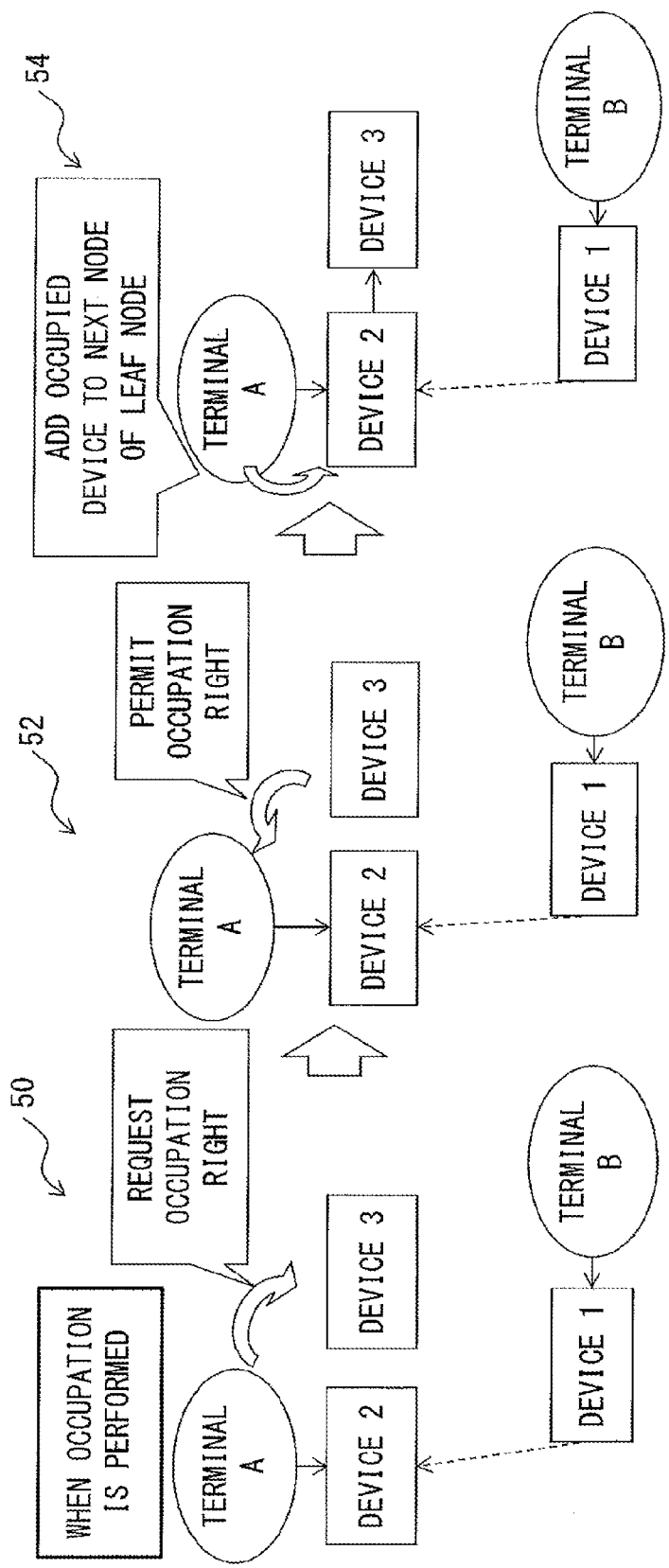
FIG. 15 is a diagram explaining an example of deformation of a resource circulant graph at the time of obtaining a control right of a device.
Figure 16:
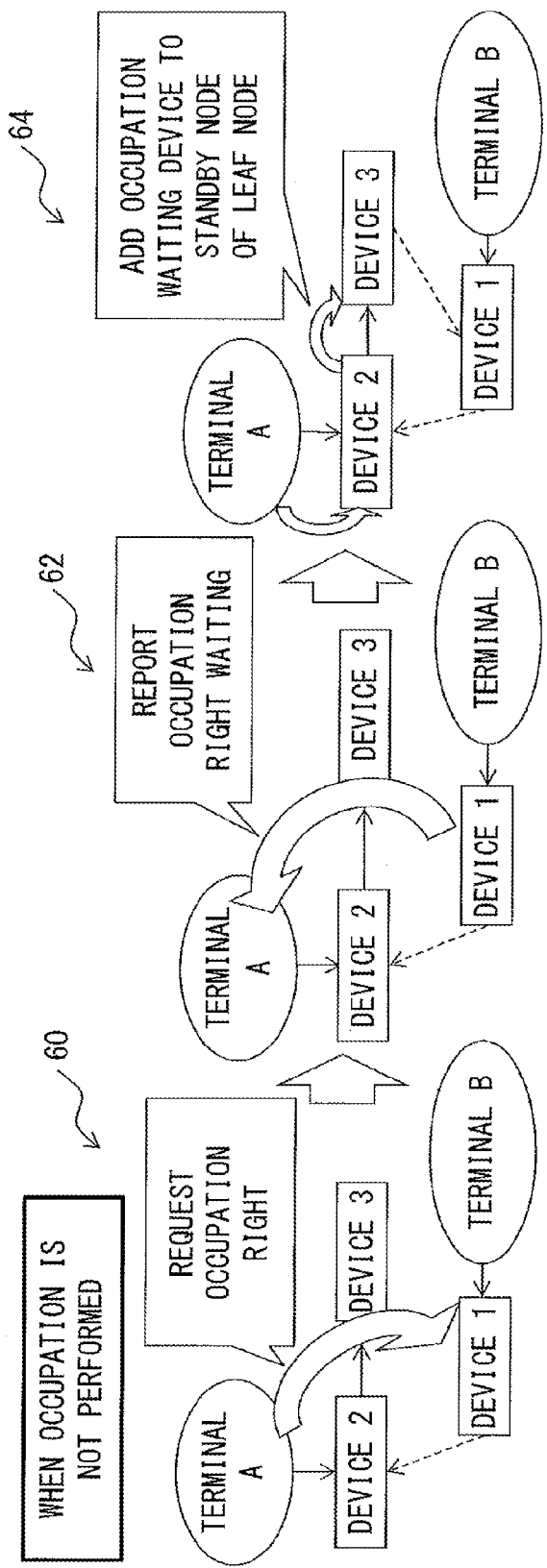
FIG. 16 is a diagram explaining another example of deformation of a resource circulant graph at the time of obtaining a control right of a device.

With reference to FIG. 15 and FIG. 16, deformation of a resource circulant graph at the time of obtaining a control right of a device is described. FIG. 15 is a diagram explaining an example of deformation of a resource circulant graph at the time of obtaining a control right of a device. FIG. 16 is a diagram explaining another example of deformation of a resource circulant graph at the time of obtaining a control right of a device. Here, a device may be a controlled device.

FIG. 15 is a diagram explaining an example of deformation of a resource circulant graph when a terminal occupies a controlled device.

FIG. 15 illustrates a state in which a resource circulant graph is updated when a terminal issues a control right request. A terminal first issues a control right request to a controlled device. When the terminal can obtain a control right, the terminal performs a next node adding process. When the terminal enters into a control right waiting state, the terminal performs a standby node adding process. In the next node adding process and the standby node adding process, a deformation operation is performed so as to respectively store line-type and start-type resource circulant graph topologies.

As illustrated in a graph 50 of FIG. 15, terminal A has a control right of device 2. In addition, terminal B has a control right of device 1, issues a control right request to device 2, and is in a control right waiting state. In this state, it is assumed that terminal A issues a request for an occupation right (control right) to device 3. When this happens, as illustrated in a graph 52 of FIG. 15, device 3 has not given an occupation right (control right) to any terminals, and therefore device 3 gives an occupation right (control right) to terminal A in response to a request from terminal A. Then, as illustrated in a graph 54 of FIG. 15, terminal A adds device 3 in the field "next node" of previous/next/waiting node information stored in the resource circulant graph DB 210 of device 2, which is a leaf node. In other words, a newly occupied device is added to a next node of a leaf node. In the resource circulant graph, a solid arrow (first link) is drawn from device 2 to device 3.

FIG. 16 illustrates an example of deformation of a resource circulant graph when a terminal waits for a control right of a device.

As illustrated in a graph 60 of FIG. 16, it is assumed that terminal A has control rights of device 2 and device 3. In addition, it is assumed that terminal B has a control right of device 1, issues a control right request to device 2, and is in a control right waiting state. In this state, as illustrated in the graph 60 of FIG. 16, it is assumed that terminal A issues a control right request to device 1. Then, as illustrated in a graph 62 of FIG. 16, device 1 reports waiting for a control right (occupation right) to terminal A. As illustrated in a graph 64 of FIG. 16, terminal A next adds device 1, which is a device whose occupation right terminal A is waiting for, in the field "standby node" of previous/next/waiting node information stored in the resource circulant graph DB 210 of device 3, which is a leaf node (a node that has no slave nodes).

<<Deadlock Detection>>

FIG. 17 is a diagram explaining an example of deadlock detection using a resource circulant graph according to the embodiment. In the example illustrated in FIG. 17, terminal A has control rights of device 2 and device 3, and terminal B has a control right of device 1, issues a control right request to device 2, and is in a control right waiting state.

When a terminal enters into a state of waiting for a control right of a controlled device, the resource circulant graph updating unit 206 performs a process of updating a resource circulant graph as illustrated in FIG. 16, and the transfer message generator 2002 of the deadlock detector 200 generates a message. Then, the network transmitter 2022 of the communicator 202 transmits the message. If the network receiver 2020 receives the message, the deadlock determining unit 2000 of the deadlock detector 200 determines whether a deadlock has occurred.

It is assumed for example that terminal A generates and transmits a message. Because "device 2" has been stored in the field "next node" of previous/next/standby node information stored in the resource circulant graph DB 210 of terminal A, the message is transmitted to device 2. In the field "next node" of previous/next/standby node information stored in the resource circulant graph DB 210 of device 2, "device 3" has been stored. Therefore, the message is transferred from device 2 to device 3. When this happens, information on a time at which the message arrived at device 2, information on a terminal that has a control right of device 2 or the like may be stored in the field "arrived node field/priority information" of the message. In the field "standby node" of previous/next/standby node information stored in the resource circulant graph DB 210 of device 3, "device 1" has been stored. Therefore, the message is transferred from device 3 to device 1. When this happens, information on a time at which the message arrived at device 3, information on a terminal that has a control right of device 3 or the like may be stored in the field "arrived node field/priority information" of the message. In the field "standby node" of previous/next/standby node information stored in the resource circulant graph DB 210 of device 1, "device 2" has been stored. Therefore, the message is transferred from device 1 to device 2.

Upon receipt of the message, the network receiver 2020 of the communicator 202 of device 2 transmits the message to the deadlock determining unit 2000 of the deadlock detector 200. The deadlock determining unit 2000 of device 2 discovers in the field "arrived node field/priority information" of the received message that the message has already arrived at device 2, and determines that a deadlock has occurred.

<<Deadlock Elimination>>

Figure 18:
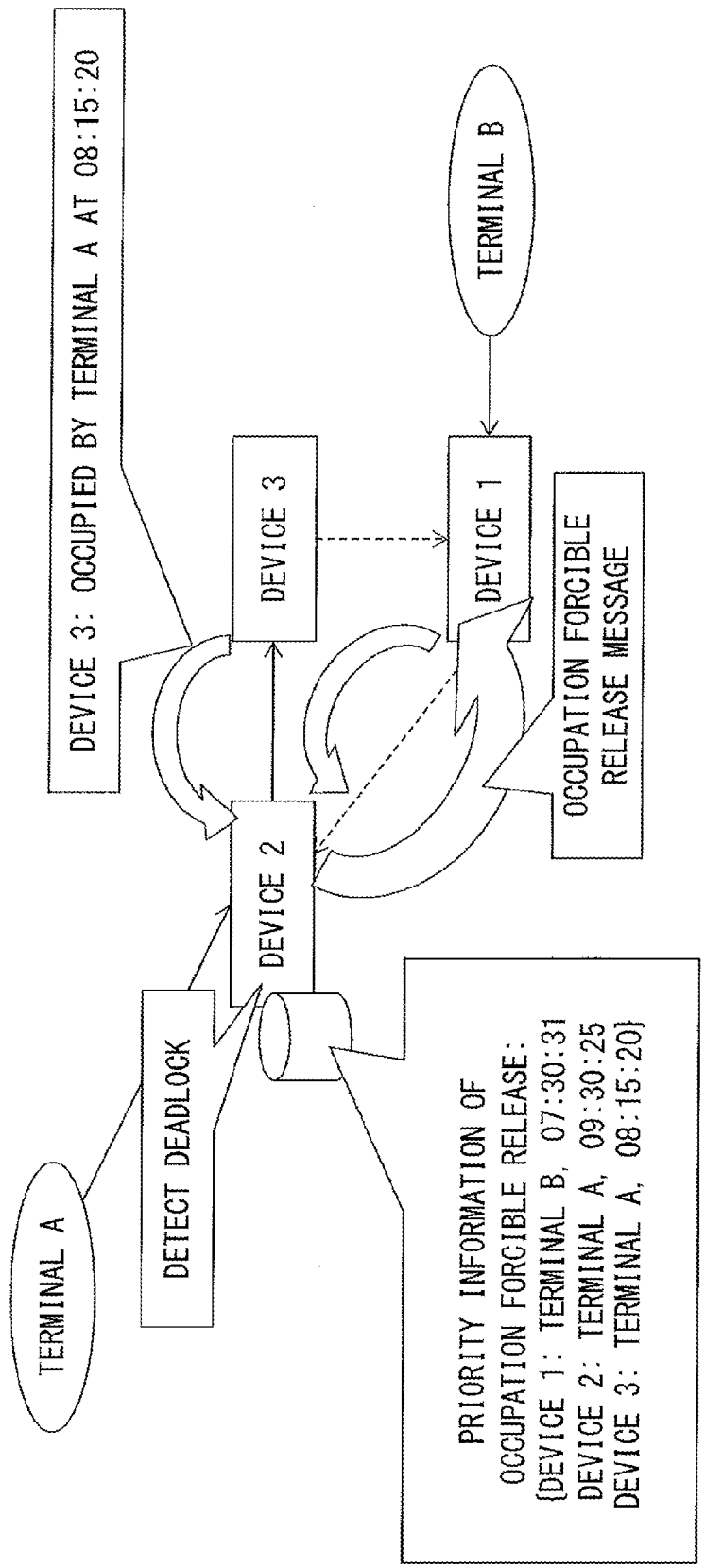
FIG. 18 is a diagram explaining an example of deadlock elimination using a resource circulant graph according to the embodiment.
Figure 19:
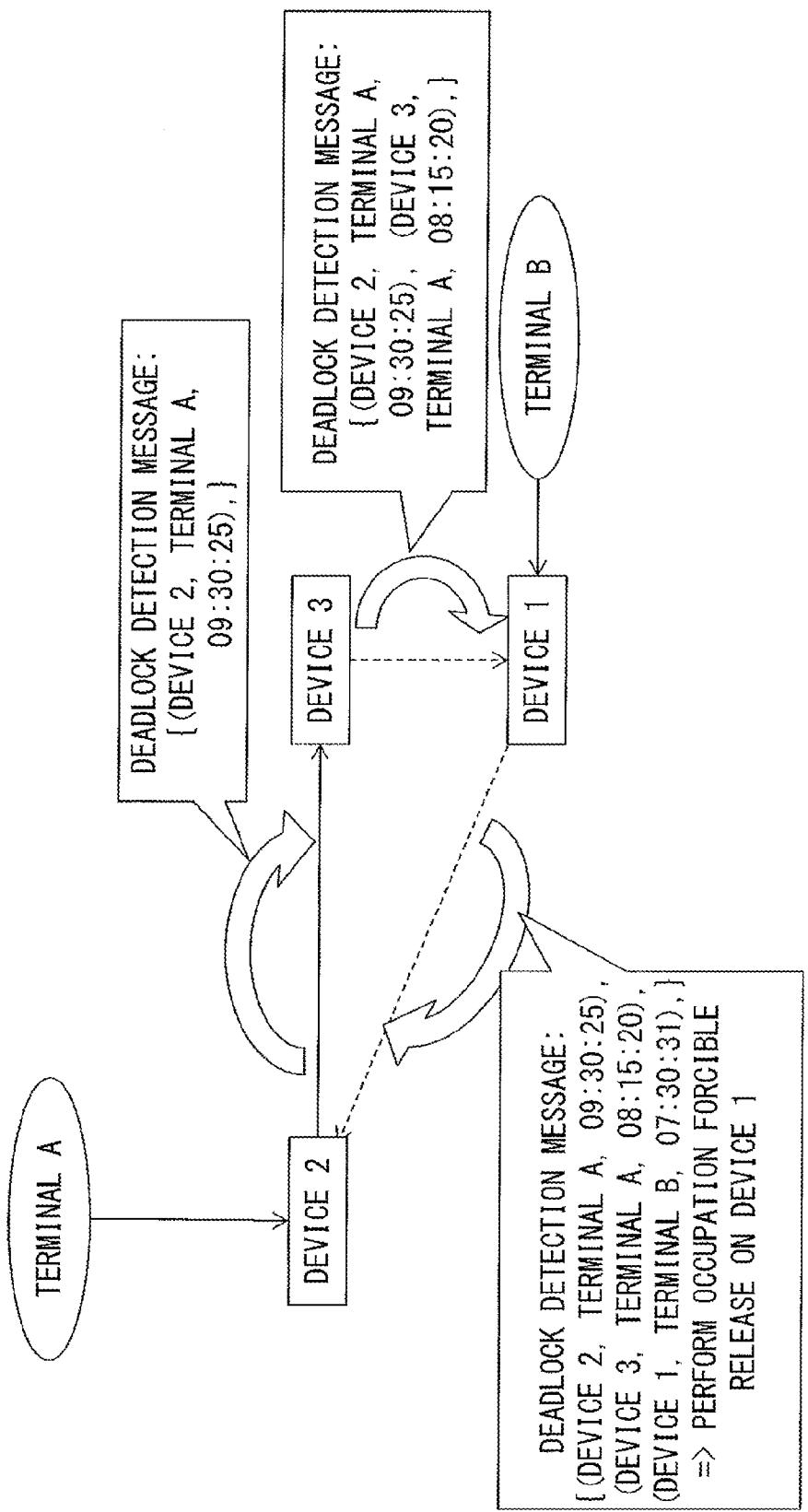
FIG. 19 is a diagram explaining an example of deadlock detection and elimination using a resource circulant graph according to the embodiment.

With reference to FIG. 18 and FIG. 19, deadlock elimination using a resource circulant graph is described.

FIG. 18 is a diagram explaining an example of deadlock elimination using a resource circulant graph according to the embodiment. In deadlock elimination, information used for determining a terminal that releases an occupation right may include an occupation start time, priority at the time of device occupation, the number of connections between a previous node and a next node, the number of standby nodes, the availability of communication with a terminal or the like. In the example illustrated in FIG. 18, after deadlock detection, an inquiry is conducted again to a device when a deadlock is eliminated. In this case, the message illustrated in FIG. 14 may include only "message issuer URI", "message transmitter URI", and "message transmission destination URI".

As illustrated in FIG. 18, it is assumed that terminal A has control rights of device 2 and device 3. It is also assumed that terminal B has a control right of device 1, issues a control right request to device 2, and is in a control right waiting state.

It is further assumed that device 3 receives the control right request from terminal A, and is occupied at 08:15:20. Similarly to the example illustrated in FIG. 17, upon receipt of a message, the network receiver 2020 of the communicator 202 of device 2 transmits the message to the deadlock determining unit 2000 of the deadlock detector 200. The deadlock determining unit 2000 of device 2 discovers in the field "arrived node field/priority information" of the received message that the message has already arrived at device 2, and determines that a deadlock has occurred.

The deadlock eliminating unit 204 of device 2, which has determined that a deadlock has occurred, generates a report for obtaining information for determining priority, using information included in the received message, and transmits the report from the network transmitter 2022 to each of the devices included in a cycle path.

The network receiver 2020 of device 2 receives a response to the report for obtaining information for determining priority from each of the devices included in the cycle path, and stores information included in the response in the priority determination information DB 208.

The deadlock eliminating unit 204 of device 2 determines a terminal that will rescind (abort) an occupation right of a controlled device, using the information included in the response to the report for obtaining information for determining priority that has been stored in the priority determination information DB 208.

The deadlock eliminating unit 204 of device 2 transmits a report (message) to a terminal that will perform abortion so as to perform a process of rescinding (aborting) the occupation right of the controlled device. The terminal that has received the report (message) transmits a message to a device that the terminal has occupied, and releases an occupation right of the device.

In the example illustrated in FIG. 18, it is assumed that information on a transmission time of a control right request, such as "device 1: terminal B, 7:30:31", "device 2: terminal A, 9:30:25", or "device 3: terminal A, 8:15:20", is included in the priority determination information DB 208 of device 2 on the basis of the response to the report for obtaining information for determining priority. In this case, the deadlock eliminating unit 204 of device 2 determines that device 1, which received a control right request the earliest, has the highest priority, transmits a report (message) to terminal B that has occupied device 1, and has terminal B perform a process of rescinding (aborting) an occupation right of device 1.

As described above, even when communication between a terminal and a controlled device is unavailable, deadlocks can be detected and eliminated.

FIG. 19 is a diagram explaining an example of deadlock detection and elimination using a resource circulant graph according to the embodiment.

In this example, the distributed data processing device 20 can also detect and eliminate deadlocks simultaneously by adding information on a terminal that will release an occupation right at the time of deadlock elimination in a message to be transmitted for deadlock detection. In this case, the message illustrated in FIG. 14 includes four fields, i.e., "message issuer URI", "message transmitter URI", "message transmission destination URI", and "arrived node field/priority information".

As illustrated in FIG. 19, it is assumed that terminal A has control rights of device 2 and device 3. It is also assumed that terminal B has a control right of device 1, issues a control right request to device 2, and is in a control right waiting state.

It is further assumed that device 3 receives a control right request from terminal A and is occupied at 08:15:20. Similarly to the example in FIG. 17, upon receipt of a message, the network receiver 2020 of the communicator 202 of device 2 transmits the message to the deadlock determining unit 2000 of the deadlock detector 200. The deadlock determining unit 2000 of device 2 discovers in the field "arrived node field/priority information" of the received message that the message has already arrived at device 2, and determines that a deadlock has occurred.

The deadlock eliminating unit 204 of device 2 extracts priority information of occupation forcible release from the field "arrived node field/priority information" of the message. As an example, in the example illustrated in FIG. 19, it is assumed that the field "arrived node field/priority information" of the message includes information on a controlled device that the message has arrived at, a terminal that has an occupation right (control right) of the controlled device, and a transmission time of a control right request, such as "device 1: terminal B, 7:30:31", "device 2: terminal A, 9:30:25", or "device 3: terminal A, 8:15:20". The deadlock eliminating unit 204 of device 2 determines that device 1, which received a control right request the earliest, has the highest priority, transmits a report (message) to terminal B that has occupied device 1, and has terminal B perform a process of rescinding (aborting) an occupation right of device 1.

As described above, even when a terminal fails to communicate with a controlled device, deadlocks can be detected and eliminated.

FIG. 20 illustrates an example of a configuration of a distributed data processing device.

A computer 300 includes a Central Processing Unit (CPU: processor) 302, a Read Only Memory (ROM) 304, and a Random Access Memory (RAM) 306. The computer 300 further includes a hard disk device 308, an input device 310, a display device 312, an interface device 314, and a recording medium driving device 316. These components are connected via a bus line 318, and are capable of transmitting/receiving various types of data to/from each other under the control of the CPU 302.

The Central Processing Unit (CPU) 302 is an arithmetic processing unit that controls operation of the entirety of the computer 300, and functions as a control processing unit of the computer 300.

The Read Only Memory (ROM) 304 is a read-only semiconductor memory in which a prescribed basic control program has been stored. The CPU 302 can control operations of respective components of the computer 300 by reading and executing the basic control program at the time of starting the computer 300.

The Random Access Memory (RAM) 306 is a random writable/readable semiconductor memory that is used as a working storage area as needed when the CPU 302 executes various control programs.

The hard disk device 308 is a storage device that has stored various control programs or various types of data executed by the CPU 302. The CPU 302 can perform various control processes as described later by reading and executing a prescribed control program stored in the hard disk device 308.

The input device 310 is, for example, a mouse device or a keyboard device, and when the input device 310 is operated by a user of an information processing device, the input device 310 obtains input of various types of information that are associated with the operation contents, and transmits the obtained input information to the CPU 302.

The display device 312 is, for example, a liquid crystal display, and displays various texts or images in accordance with pieces of display data transmitted from the CPU 302.

The interface device 314 manages transmission/reception of various types of information to/from various pieces of equipment connected to the computer 300.

The recording medium driving device 316 is a device that reads various control programs or various types of data stored in a portable recording medium 320. The CPU 302 can also be configured to perform various control processes as described later by reading and executing a prescribed control program stored in the portable recording medium 320 via the recording medium driving device 316. Note that examples of the portable recording medium 320 include a flash memory that is provided with, for example, a USB (Universal Serial Bus) connector, a CD-ROM (Compact Disc Read Only Memory), DVD-ROM (Digital Versatile Disc Read Only Memory), and the like.

In order to configure a cooperation equipment selecting device using the computer 300 as described above, for example, a control program (distributed data processing program) is generated for causing the CPU 302 to perform processes performed by the respective processing units described above. The generated control program has been stored in the hard disk device 308 or the portable recording medium 320. A prescribed instruction is given to the CPU 302 so as to read and execute the control program (distributed data processing program). As a result, functions that a distributed data processing device has are provided by the CPU 302.

<Distributed Data Process>

With reference to FIGS. 21-29, a distributed data process is described.

Figure 21:
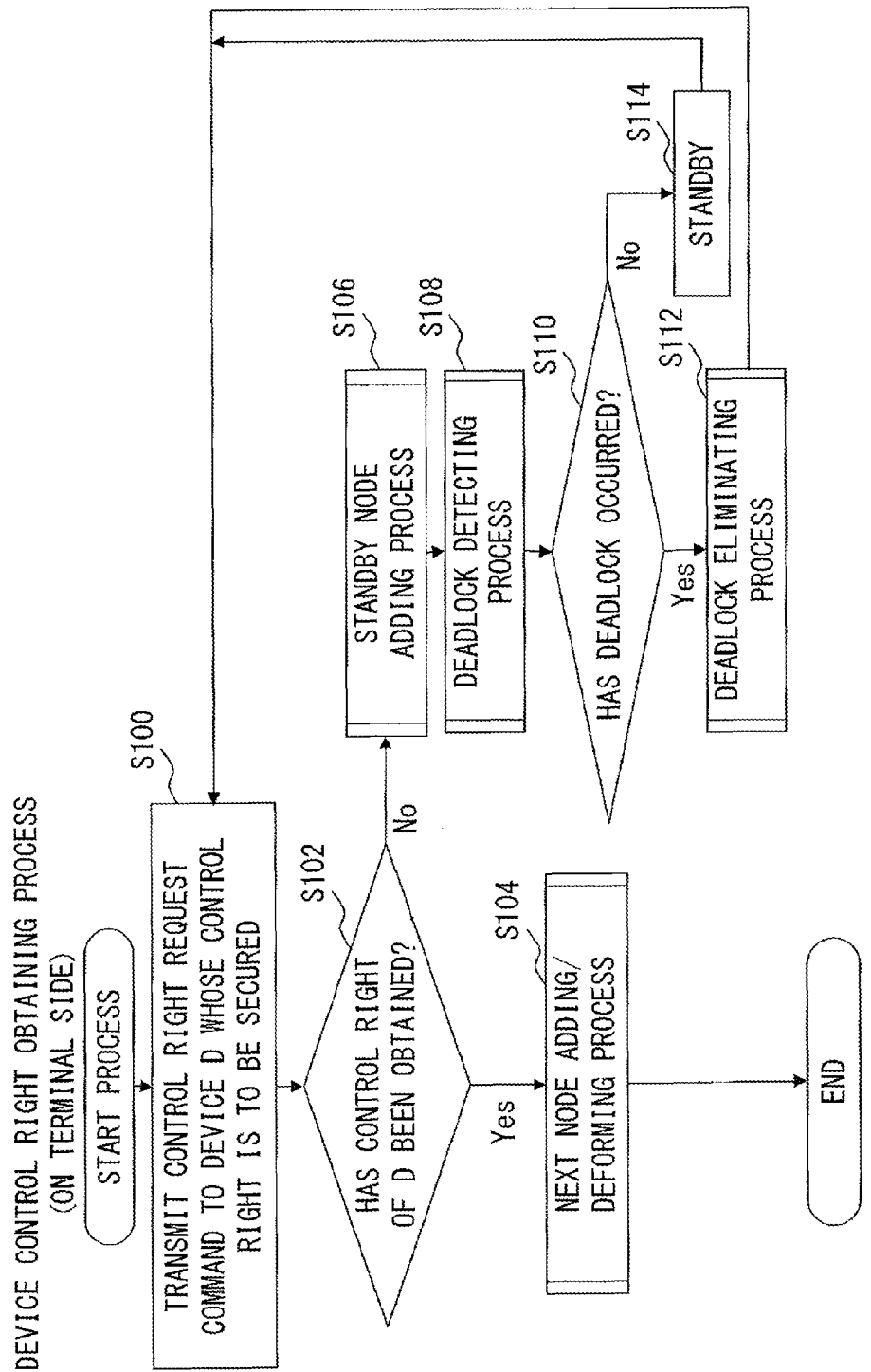
FIG. 21 illustrates an example of a flow of a device control right obtaining process on a terminal side.

FIG. 21 illustrates an example of a flow of a device control right obtaining process on a terminal side.

In addition, when a distributed data processing device is a general-purpose computer 300 as illustrated in FIG. 20, the description below defines a control program for performing the device control right obtaining process (distributed data processing program). In other words, the description below is also a description of a control program for causing a general-purpose computer to perform the process described below (distributed data processing program).

When a process is started, in S100, the network transmitter 2022 of terminal A issues a control right request to device D (a controlled device) whose control right terminal A desires to secure. Issuing a control right request may be transmitting a control right request command. When the process of this step is finished, the process moves on to S102.

In S102, the occupation source terminal managing unit 2060 of terminal A determines whether a report for permitting a control right has been received from device D (a controlled device) whose control right terminal A desires to secure, that is, whether a control right of device D has been obtained. When the determination result in this step is "Yes", that is, when the control right of device D has been obtained, the process moves on to S104. When the determination result in this step is "No", that is, when the control right of device D has not been obtained, the process moves on to S106.

In S104, the resource adding/updating unit 2062 of the resource circulant graph updating unit 206 of terminal A performs the deformation of a resource circulant graph.

A next node adding/deforming process of S104 is described with reference to FIG. 22.

FIG. 22 illustrates an example of a flow of a next node adding/deforming process on a terminal side When a next node adding/deforming process is started, the resource adding/updating unit 2062 of the resource circulant graph updating unit 206 of terminal A determines whether the next node field N of information stored in the resource circulant graph DB 210 of terminal A is null. When the determination result in this step is "Yes", that is, when the next node field N of terminal A is null, the process moves on to S210. When the determination result in this step is "No", that is, when the next node field N of terminal A is not null, the process moves on to S202.

In S202, the resource adding/updating unit 2062 of the resource circulant graph updating unit 206 of terminal A determines whether a topology of the resource circulant graph is line-type or star-type. An example of a resource circulant graph that has a line-type topology is illustrated in FIG. 10. An example of a resource circulant graph that has a star-type topology is illustrated in FIG. 11. When the determination result in this step is "line-type", that is, when the topology of the resource circulant graph is line-type, the process moves on to S204. When the determination result in this step is "star-type", that is, when the topology of the resource circulant graph is star-type, the process moves on to S206.

In S204, the resource adding/updating unit 2062 of the resource circulant graph updating unit 206 of terminal A traces a next node in the next node field N in the resource circulant graph stored in the resource circulant graph DB 210 of terminal A, and adds device D (controlled device) whose control right terminal A has obtained after a node at the end. When the process of this step is finished, the process moves on to S208.

In S206, the resource adding/updating unit 2062 of the resource circulant graph updating unit 206 of terminal A adds device D (controlled device) whose control right terminal A has obtained in the next node field N in the resource circulant graph stored in the resource circulant graph DB 210 of terminal A. When the process of this step is finished, the process moves on to S208.

In S210, the resource adding/updating unit 2062 of the resource circulant graph updating unit 206 of terminal A sets device D (controlled device) whose control right terminal A has newly obtained in the next node field N of terminal A in the resource circulant graph stored in the resource circulant graph DB 210 of terminal A. When the process of this step is finished, the process moves on to S212.

In S212, the resource adding/updating unit 2062 of the resource circulant graph updating unit 206 of terminal A determines whether the standby node field W of terminal A is null in the resource circulant graph stored in the resource circulant graph DB 210 of terminal A. When the determination result in this step is "Yes", that is, when the standby node field W of terminal A is null, the process moves on to S208. When the determination result in this step is "No", that is, when the standby node field W of terminal A is not null, the process moves on to S214.

In S214, the resource adding/updating unit 2062 of the resource circulant graph updating unit 206 of terminal A sets a value of the standby node field W of terminal A in the standby node field of device D (controlled device) in the resource circulant graph stored in the resource circulant graph DB 210 of terminal A. When the process of this step is finished, the process moves on to S216.

In S216, the resource adding/updating unit 2062 of the resource circulant graph updating unit 206 of terminal A clears the standby node field W of terminal A in the resource circulant graph stored in the resource circulant graph DB 210 of terminal A. When the process of this step is finished, the process moves on to S208.

In S208, the resource adding/updating unit 2062 of the resource circulant graph updating unit 206 of terminal A transmits information on a device that has set device D so as to be a next node from the network transmitter 2022 of the communicator 202 to device D whose control right terminal A has obtained. When the process of this step is finished, the process returns to S104 of FIG. 21.

Returning to FIG. 21, when the process of S104 is finished, the process in terminal A is finished.

In S106 of FIG. 21, the resource adding/updating unit 2062 of the resource circulant graph updating unit 206 of terminal A performs a standby node adding process.

A standby node adding process in terminal A is described with reference to FIG. 23.

Figure 23:
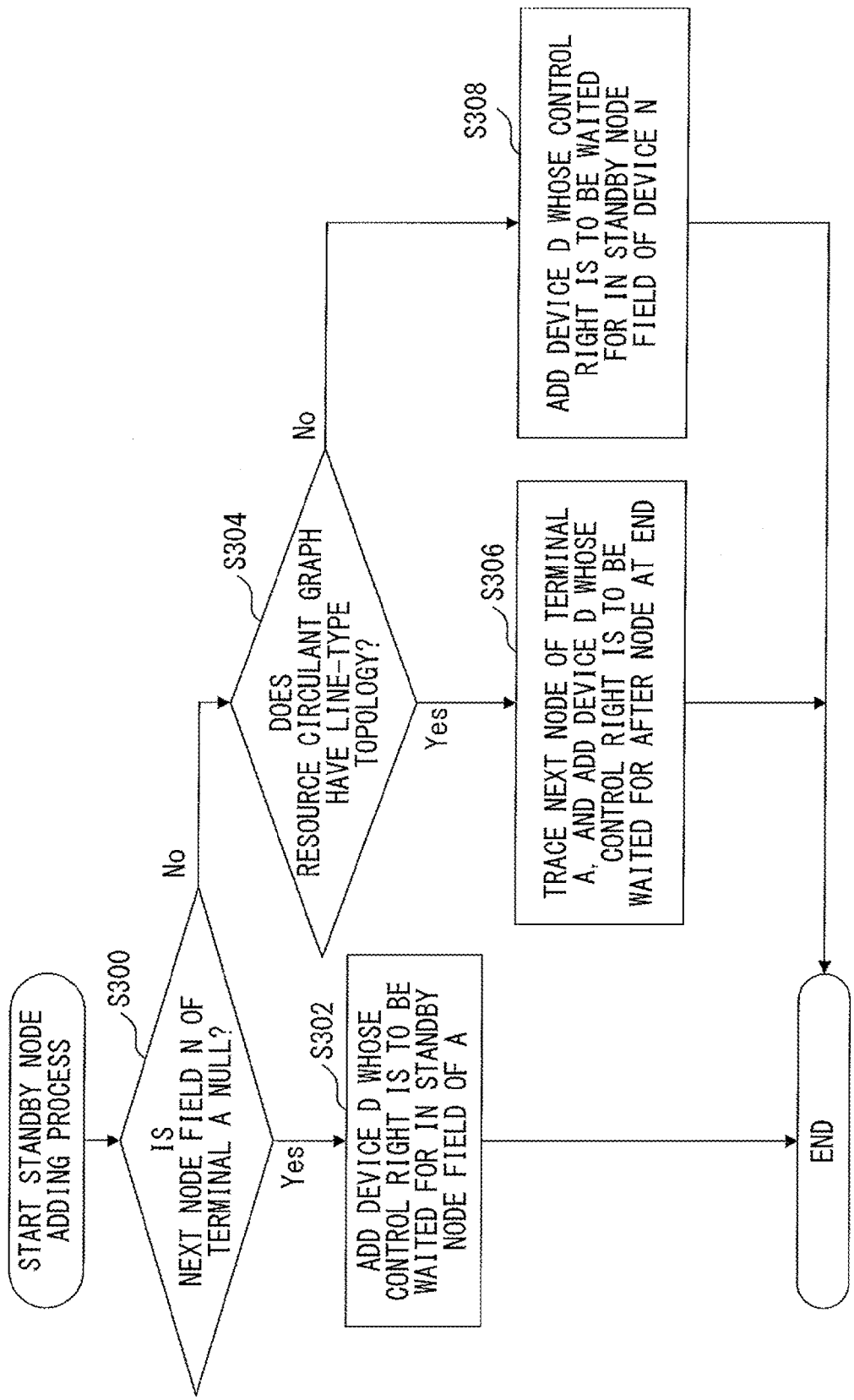
FIG. 23 illustrates an example of a flow of a standby node adding process on a terminal side.

FIG. 23 illustrates an example of a flow of a standby node adding process on a terminal side.

When the process is started, in S300, the resource adding/updating unit 2062 of the resource circulant graph updating unit 206 of terminal A determines whether the next node field N of terminal A is null in the resource circulant graph stored in the resource circulant graph DB 210 of terminal A. When the determination result in this step is "Yes", that is, when the next node field N of terminal A is null, the process moves on to S302. When the determination result in this step is "No", that is, when the next node field N of terminal A is not null, the process moves on to S304.

In S302, the resource adding/updating unit 2062 of the resource circulant graph updating unit 206 of terminal A adds device D (controlled device) whose control right terminal A newly waits for in the standby node field of terminal A in the resource circulant graph stored in the resource circulant graph DB 210 of terminal A. When the process of this step is finished, the standby node adding process is finished.

In S304, the resource adding/updating unit 2062 of the resource circulant graph updating unit 206 of terminal A determines whether the resource circulant graph stored in the resource circulant graph DB 210 has a line-type topology. When the determination result in this step is "Yes", that is, when the resource circulant graph has a line-type topology, the process moves on to S306. When the determination result in this step is "No", that is, when the resource circulant graph does not have a line-type topology, the process moves on to S308.

In S306, the resource adding/updating unit 2062 of the resource circulant graph updating unit 206 of terminal A traces a next node of terminal A in the resource circulant graph stored in the resource circulant graph DB 210 of terminal A, and adds device D (controlled device) whose control right terminal A waits for after a node at the end. When the process of this step is finished, the standby node adding process is finished.

In S308, the resource adding/updating unit 2062 of the resource circulant graph updating unit 206 of terminal A adds device D (controlled device) whose control right terminal A newly waits for in the standby node field of device N in the resource circulant graph stored in the resource circulant graph DB 210 of terminal A. When the process of this step is finished, the standby node adding process is finished.

When the process of S106 of FIG. 21 is finished, the process moves on to S108.

In S108, the deadlock detector 200 of device A performs a deadlock detecting process.

The deadlock detecting process is described with reference to FIG. 24.

Figure 24:
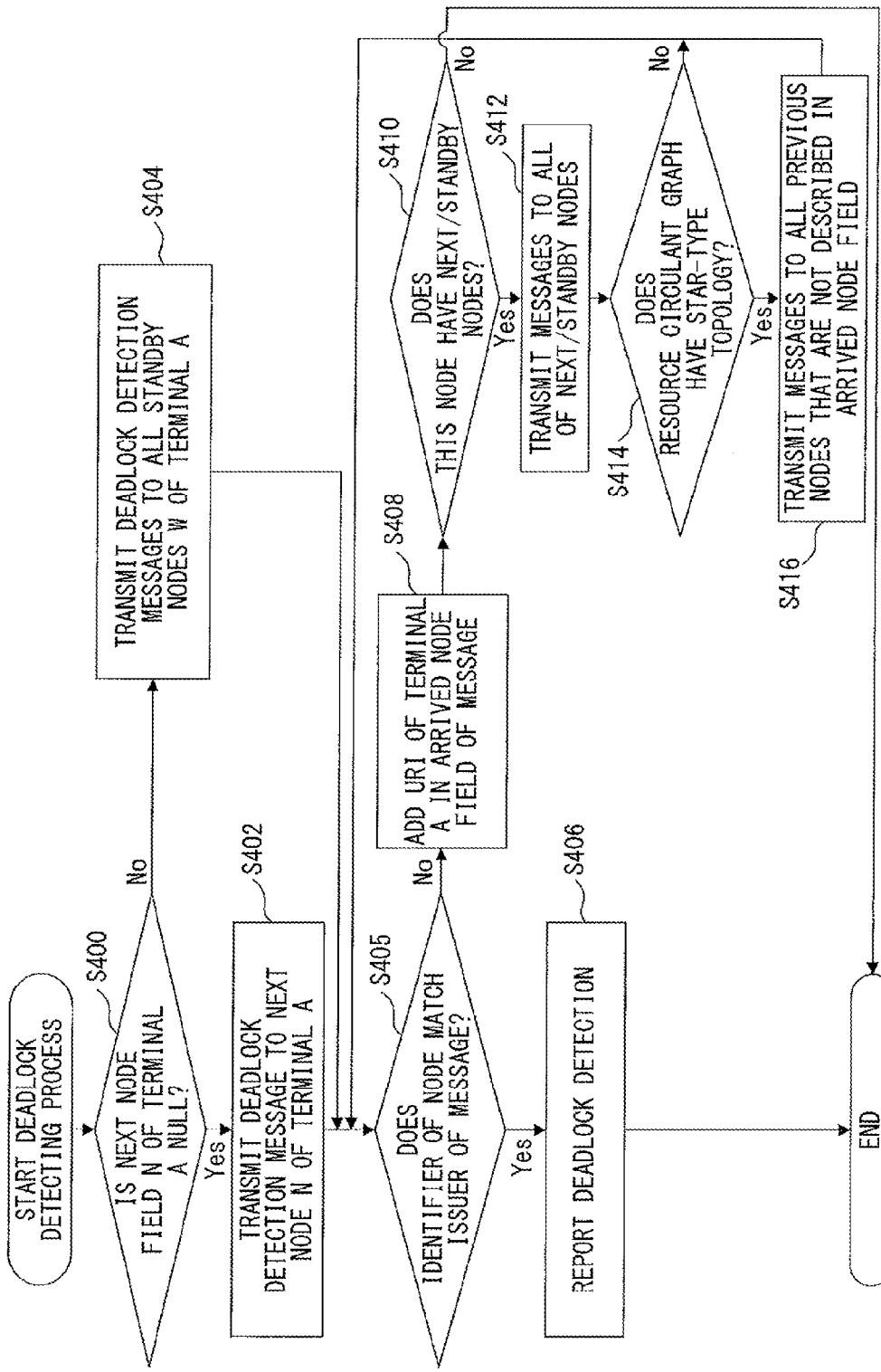
FIG. 24 illustrates an example of a flow of a deadlock detecting process using a resource circulant graph according to the embodiment.

FIG. 24 illustrates an example of a flow of a deadlock detecting process using a resource circulant graph according to the embodiment.

When the deadlock detecting process is started, in S400, the transfer message generator 2002 of the deadlock detector 200 of device A determines whether the next node field N of terminal A is null. When the determination result in this step is "Yes", that is, when the next node field N of terminal A is null, the process moves on to S402. When the determination result in this step is "No", that is, when the next node field N of terminal A is not null, the process moves on to S404.

In S402, the transfer message generator 2002 of the deadlock detector 200 of device A generates a deadlock detection message, and transmits the deadlock detection message to the next node N of the device A via the network transmitter 2022 of the communicator 202. In order to specify the next node N, information stored in the resource circulant graph DB may be referred to. When the process of this step is finished, the process moves on to S404.

In S404, the transfer message generator 2002 of the deadlock detector 200 of device A generates a deadlock detection message, and transmits the deadlock detection message to all of the standby nodes W of device A via the network transmitter 2022 of the communicator 202. In order to specify the standby nodes W, information stored in the resource circulant graph DB may be referred to. When the process of this step is finished, the process moves on to S405.

In S405, the deadlock determining unit 2000 of the deadlock detector 200 of device A determines whether an identifier of a node matches an issuer of the message that the network receiver 2020 has received. When the determination result in this step is "Yes", that is, when the identifier of the node matches the issuer of the message, the process moves on to S406. When the determination result in this step is "No", that is, when the identifier of the node does not match the issuer of the message, the process moves on to S408.

In S406, the transfer message generator 2002 of the deadlock detector 200 of device A generates a message for reporting deadlock detection, and transmits the message from the network transmitter 2022 of the communicator 202 so as to report the deadlock detection. When the process of this step is finished, the deadlock detecting process is finished.

In S408, the transfer message generator 2002 of the deadlock detector 200 of device A adds an URI of the device A in the arrived node field of the message. When the process of this step is finished, the process moves on to S410.

In S410, the transfer message generator 2002 of the deadlock detector 200 of device A refers to the resource circulant graph DB 210, and determines whether a host node (device A) has next nodes or standby nodes. When the determination result in this step is "Yes", that is, when the host node (device A) has next nodes or standby nodes, the process moves on to S412. When the determination result in this step is "No", that is, when the host node (device A) does not have any next nodes or standby nodes, the deadlock detecting process is finished.

In S412, the transfer message generator 2002 of the deadlock detector 200 of device A transmits messages to all of the next nodes or standby nodes via the network transmitter 2022 of the communicator 202. When the process of this step is finished, the process moves on to S414.

In S414, the transfer message generator 2002 of the deadlock detector 200 of device A refers to the resource circulant graph DB 210, and determines whether the resource circulant graph has a star-type topology. When the determination result in this step is "Yes", that is, when the resource circulant graph has a star-type topology, the process moves on to S416. When the determination result in this step is "No", that is, when the resource circulant graph does not have a star-type topology, the process returns to S404.

In S416, the transfer message generator 2002 of the deadlock detector 200 of device A transmits messages to all of the previous nodes that are not indicated in the arrived node field via the network transmitter 2022 of the communicator 202. When the process of this step is finished, the process returns to S404.

When the deadlock detecting process is finished, the process moves on to S110 of FIG. 21.

In S110 of FIG. 21, the deadlock determining unit 2000 of the deadlock detector 200 of device A determines whether a deadlock has occurred. When the determination result in this step is "Yes", that is, when a deadlock has occurred, the process moves on to S112. When the determination result in this step is "No", that is, when a deadlock has not occurred, the process returns to S114.

In S114, the deadlock determining unit 2000 of the deadlock detector 200 of device A performs standby, and when input for securing a control right is performed from the outside to a controlled device, the process returns to S100.

In S112, the deadlock eliminating unit 204 of device A performs a deadlock eliminating process.

The deadlock eliminating process is described with reference to FIG. 25. The process illustrated in FIG. 25 corresponds to the case illustrated in FIG. 18.

FIG. 25 illustrates an example of a flow of a deadlock eliminating process using a resource circulant graph according to the embodiment.

When the deadlock eliminating process is started, in S500, the deadlock eliminating unit 204 of device A inquires information for determining priority to a device (controlled device) included in a cycle path via the network transmitter 2022 of the communicator 202. When the process of this step is finished, the process moves on to S502.

In S502, the deadlock eliminating unit 204 of device A determines a terminal that will rescind (abort) an occupation right of the controlled device on the basis of information included in a response to the inquiry (inquiry information). When the process of this step is finished, the process moves on to S504.

In S504, the deadlock eliminating unit 204 of device A transmits a report (message) to a terminal that will perform abortion via the network transmitter 2022 of the communicator 202, and has the terminal perform a process of rescinding (aborting) the occupation right of the controlled right. When the process of this step is finished, the process moves on to S506.

In S506, the terminal, which has received the report (message), transmits the message to a device that the terminal has occupied, and releases the occupation right of the device. When the process of this step is finished, the deadlock eliminating process is finished.

Figure 26:
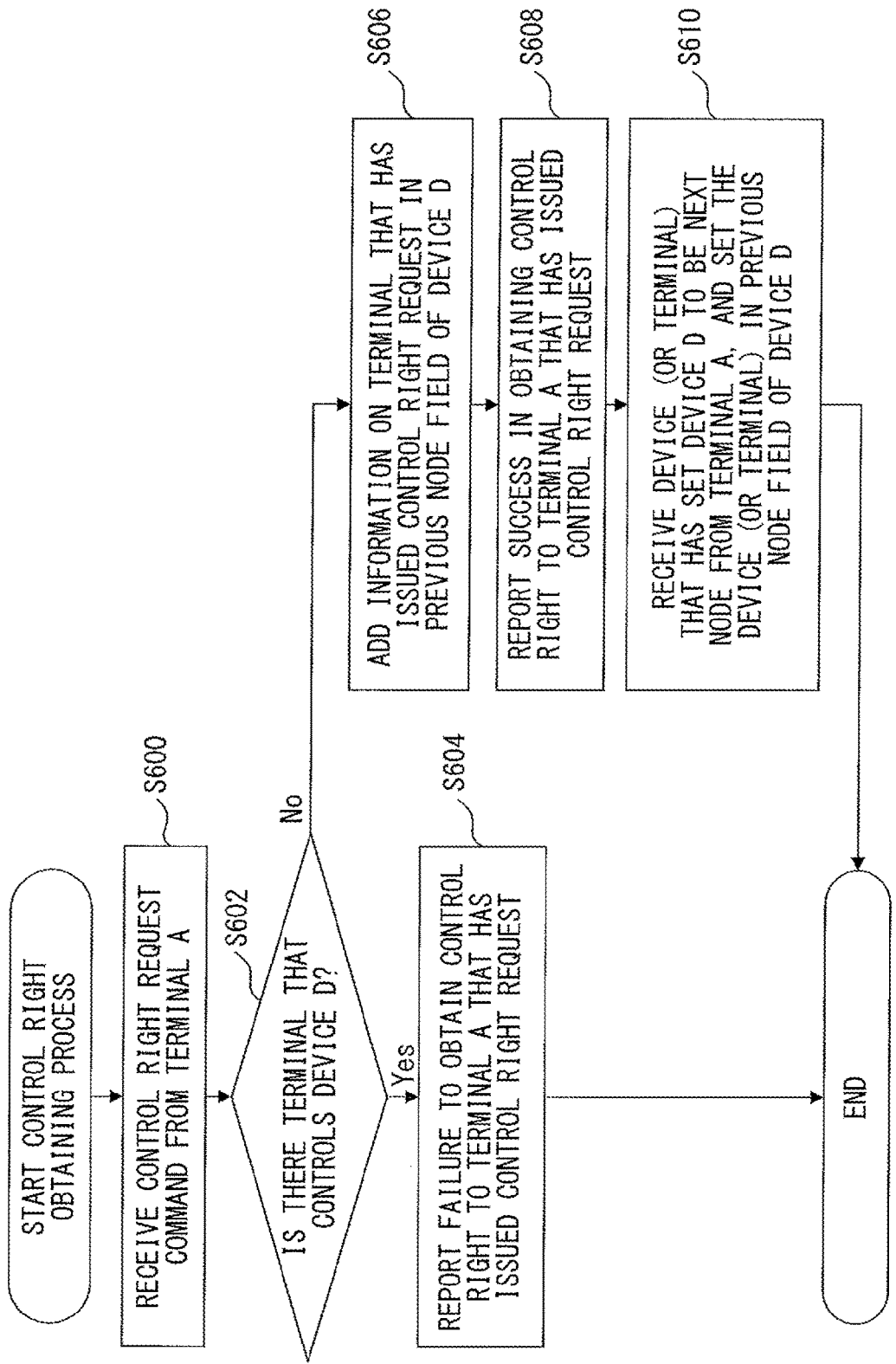
FIG. 26 illustrates an example of a flow of a device control right obtaining process on a device side.

FIG. 26 illustrates an example of a flow of a device control right obtaining process on a device side.

When the device control right obtaining process is started, in S600, the network receiver 2020 of the communicator 202 of device D receives a control right request command from terminal A, and transmits the control right request command to the occupation source terminal managing unit 2060 of the resource circulant graph updating unit 206. When the process of this step is finished, the process moves on to S602.

In S602, the occupation source terminal managing unit 2060 of the resource circulant graph updating unit 206 of device D determines whether there is a terminal that controls device D. When the determination result in this step is "Yes", that is, when there is a terminal that controls device D, the process moves on to S606. When the determination result in this step is "No", that is, when there is no terminal that controls device D, the process returns to S604.

In S604, the occupation source terminal managing unit 2060 of the resource circulant graph updating unit 206 of device D reports a failure to obtain a control right to terminal A, which has issued a control right request, via the network transmitter 2022 of the communicator 202. When the process of this step is finished, the process moves on to S606.

In S606, the transfer message generator 2002 of the deadlock detector 200 of device D adds information of a terminal that has issued a control right request in the previous node field of device D in the resource circulant graph stored in the resource circulant graph DB 210 of device D. When the process of this step is finished, the process moves on to S608.

In S608, the network transmitter 2022 of the communicator 202 of device D reports success in obtaining a control right to terminal A, which has issued the control right request. When the process of this step is finished, the process moves on to S610.

In S610, the occupation source terminal managing unit 2060 of the resource circulant graph updating unit 206 of device D receives, from terminal A, a device (or a terminal) that has set device D to be a next node in the resource circulant graph stored in the resource circulant graph DB 210 of device D, and sets the device (or the terminal) in the previous node field of device D. When the process of this step is finished, the device control right obtaining process is finished.

Figure 27:
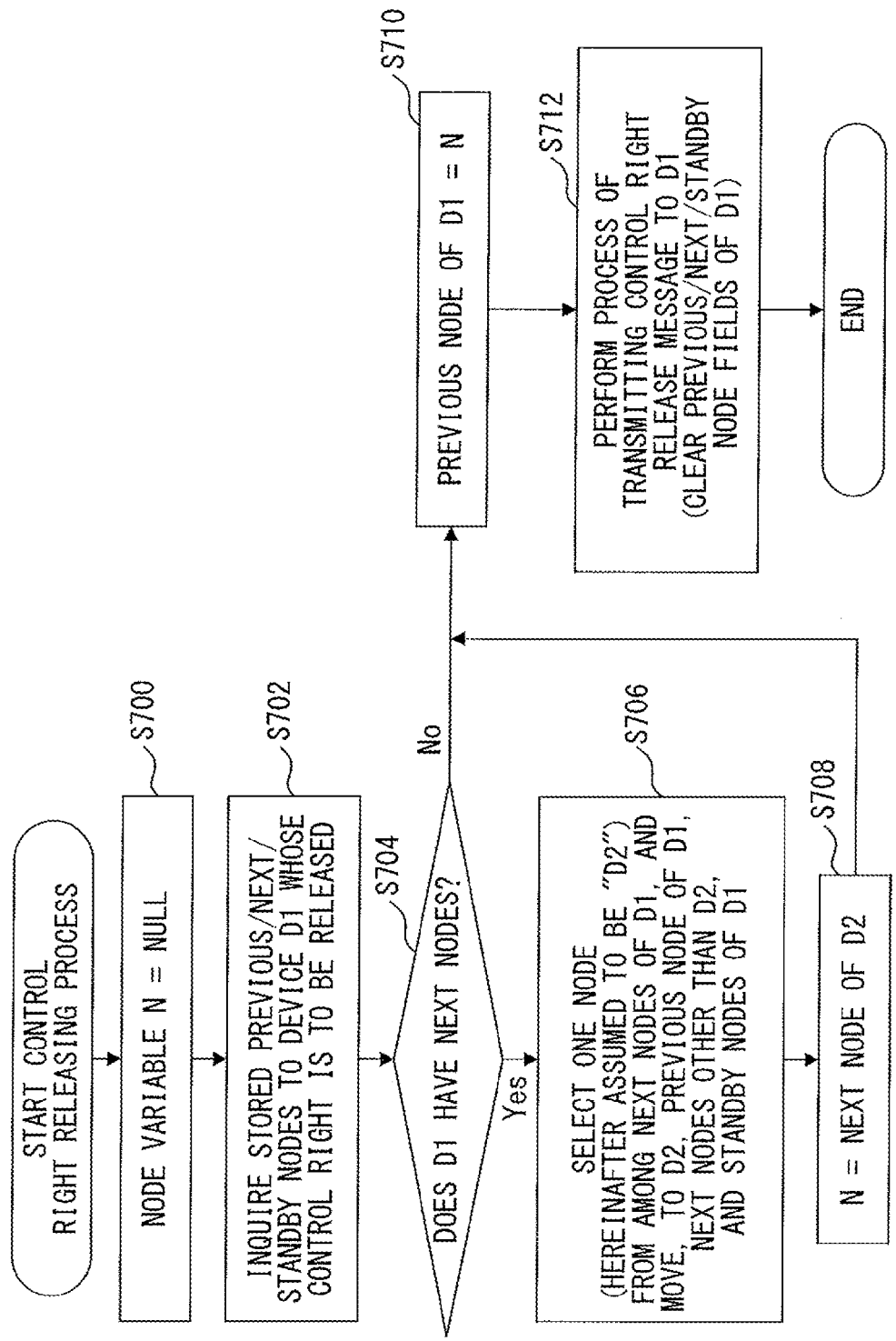
FIG. 27 illustrates an example of a flow of a device control right releasing process on a terminal side.

FIG. 27 illustrates an example of a flow of a device control right releasing process on a terminal side.

When a process is started, in S700, a terminal sets a node variable N to be null. When the process of this step is finished, the process moves on to S702.

In S702, the terminal inquiries a previous node, next nodes, and standby nodes included in device D1 whose control right is to be released. When the process of this step is finished, the process moves on to S704.

In S704, the terminal determines whether device D1 has next nodes. When the determination result in this step is "Yes", that is, when device D1 has next nodes, the process moves on to S706. When the determination result in this step is "No", that is, when device D1 has no next nodes, the process moves on to S710.

In S706, the terminal moves selects one (hereinafter, assumed to be D2) of the next nodes of device D1 in the resource circulant graph stored in the resource circulant graph DB 210 of the terminal, and moves, to device D2, a previous node of device D1, next nodes other than device D2, and standby nodes of device D1. When the process of this step is finished, the process moves on to S708.

In S708, the terminal sets "node variable N=next node of device D2". When the process of this step is finished, the process moves on to S710.

In S710, the terminal sets "node variable N=previous node of device D1". When the process of this step is finished, the process moves on to S712.

In S712, the terminal transmits a control right release message to device D1, and clears the previous node field, the next node field, and the standby node field in device D1. When the process of this step is finished, the device control right releasing process on the terminal side is finished.

Another example of a deadlock eliminating process is described with reference to FIGS. 28 and 29. The processes illustrated in FIGS. 28 and 29 correspond to the case illustrated in FIG. 19.

Figure 28:
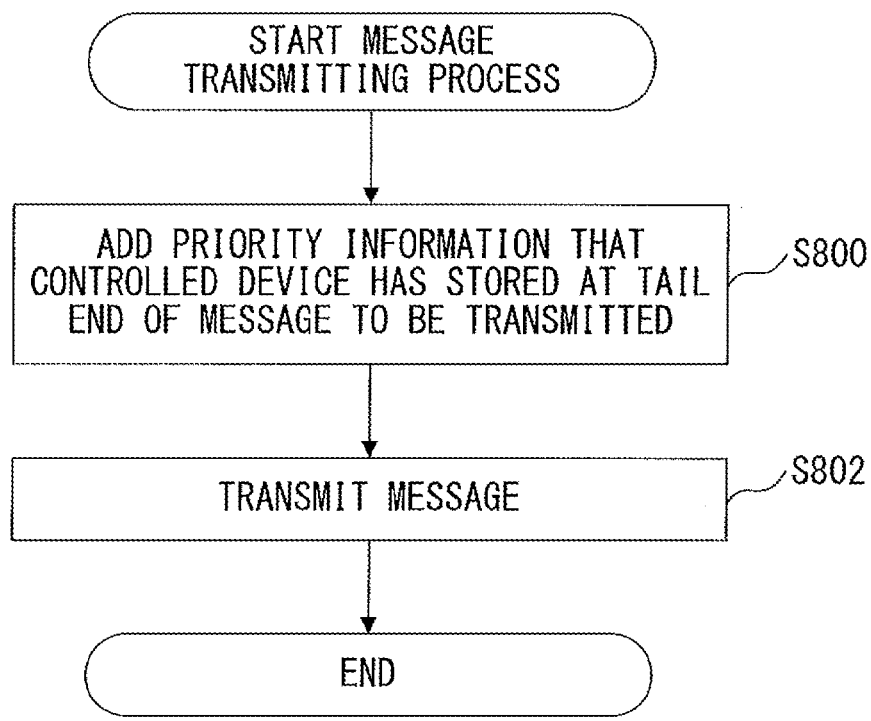
FIG. 28 illustrates an example of a flow of a deadlock detection message transmitting process.

FIG. 28 illustrates an example of a flow of a deadlock detection message transmitting process.

In the example illustrated in FIG. 28, when a process is started, in S800, the transfer message generator 2002 of the deadlock detector 200 of a terminal or a controlled device adds priority information that the device (controlled device) has stored at the tail end of a message to be transmitted. An example of a deadlock detection message in this example is illustrated in FIG. 14. When the process of this step is finished, the process moves on to S802.

In S802, the network transmitter 2022 of the communicator 202 of the terminal or the controlled device transmits the message. When the process of this step is finished, the deadlock detection message transmitting process is finished.

Figure 29:
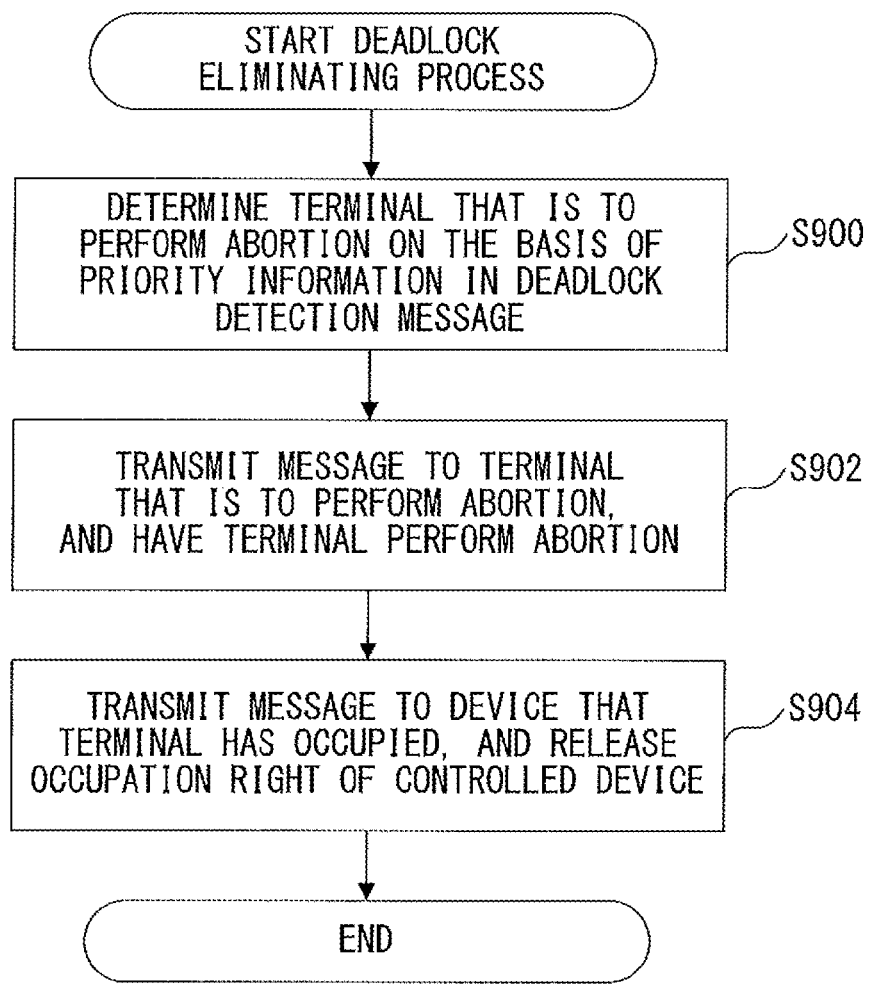
FIG. 29 illustrates an example of a flow of a deadlock eliminating process on a device side.

FIG. 29 illustrates an example of a flow of a deadlock eliminating process on a device side.

When a process is started, in S900, the deadlock eliminating unit 204 determines a terminal that will perform abortion from the priority information in the deadlock detection message. As an example, the deadlock eliminating unit 204 extracts priority information of occupation forcible release from the field "arrived node field/priority information" of the message. In the example illustrated in FIG. 19, for example, it is assumed that information on a controlled device that the message has arrived at, a terminal that has an occupation right (control right) of the controlled device, and a transmission time of a control right request, such as "device 1: terminal B, 7:30:31", "device 2: terminal A, 9:30:25", or "device 3: terminal A, 8:15:20" is included in the field "arrived node field/priority information" of the message. The deadlock eliminating unit 204 of device 2 determines that device 1, which received a control right request the earliest, has the highest priority. When the process of this step is finished, the process moves on to S902.

In S902, the deadlock eliminating unit 204 transmits a message to a terminal that will perform abortion, and has the terminal perform abortion. In the example illustrated in FIG. 19, it is determined that device 1, which received a control right request the earliest, has the highest priority, a report (message) is transmitted to terminal B, which has occupied device 1, and terminal B performs a process of rescinding (aborting) an occupation right of device 1. When the process of this step is finished, the process moves on to S904.

In S904, the terminal that will perform abortion transmits a message to a device that the terminal has occupied, and releases an occupation right of the device. When the process of this step is finished, the deadlock eliminating process is finished.

Embodiment

Figure 30:
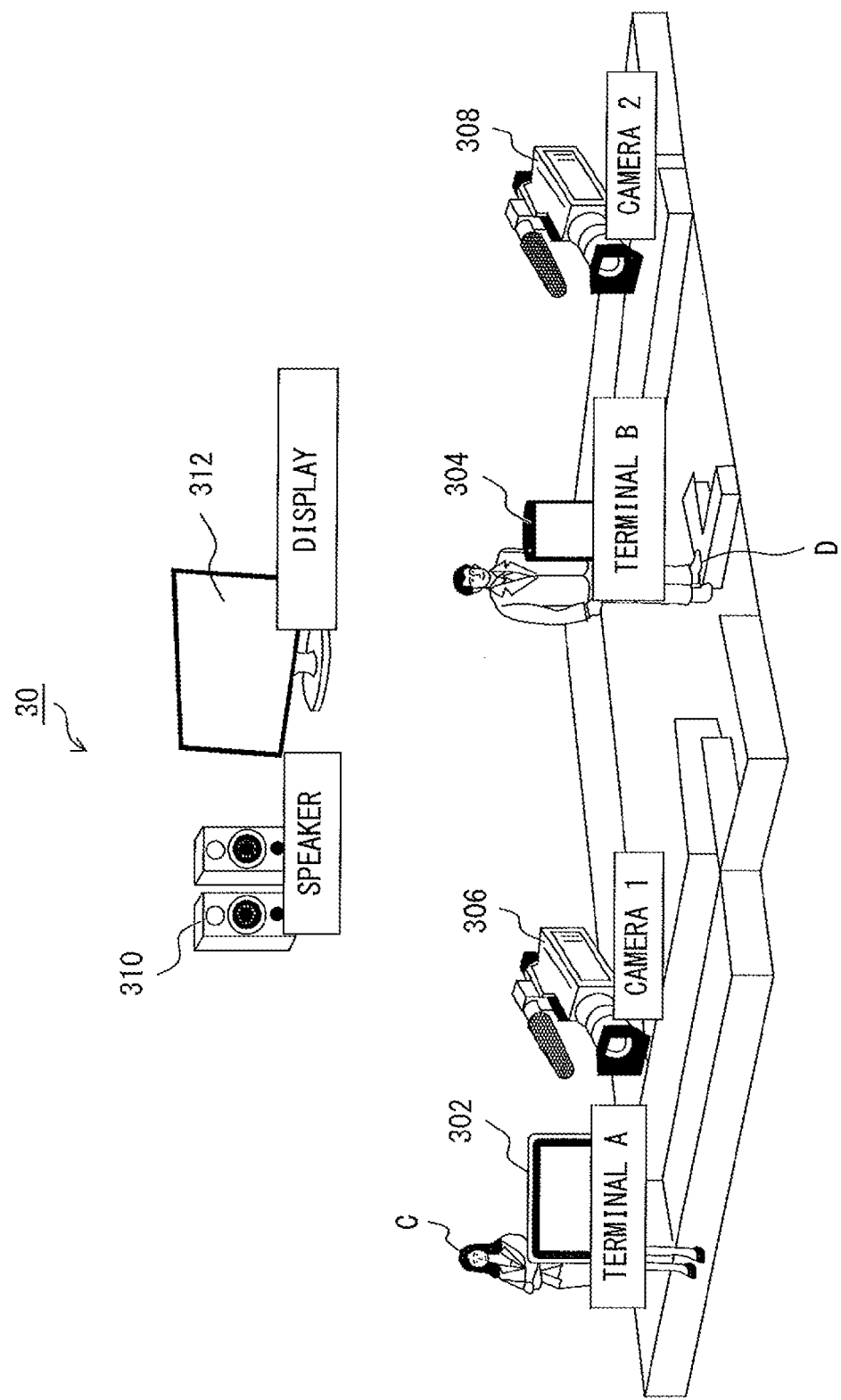
FIG. 30 illustrates another example of a system in which pieces of controlled equipment are operated from terminals.
Figure 31A:
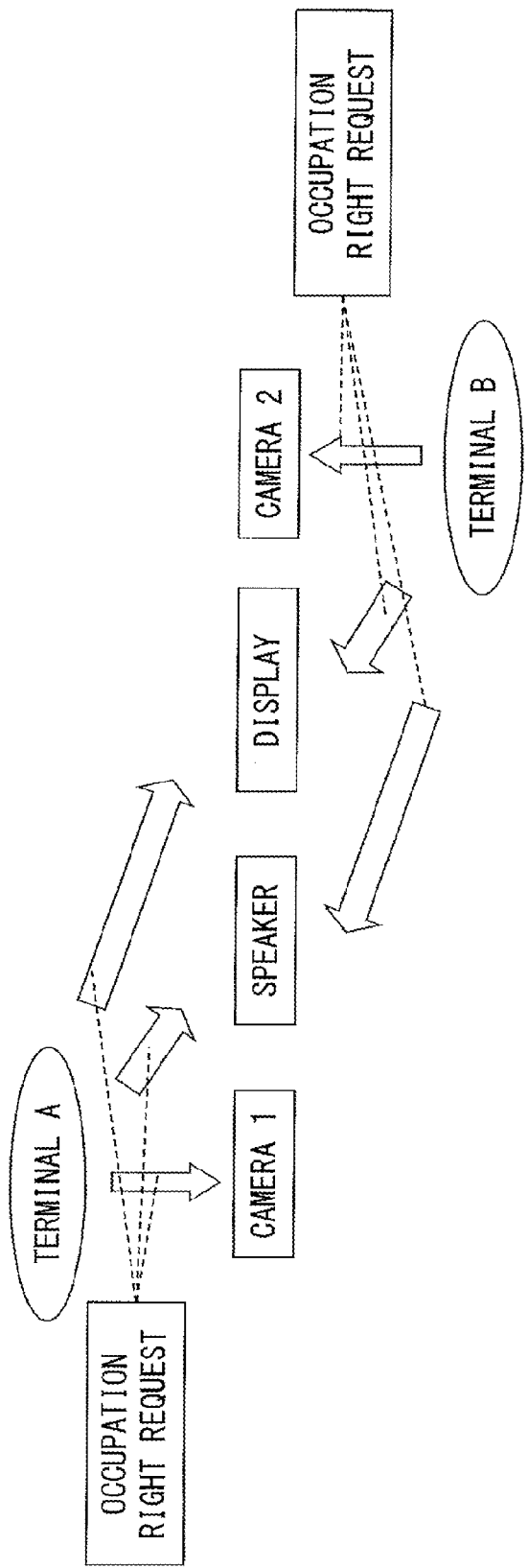
FIG. 31A is a diagram explaining an example of deadlock detection and elimination (no. 1).
Figure 31B:
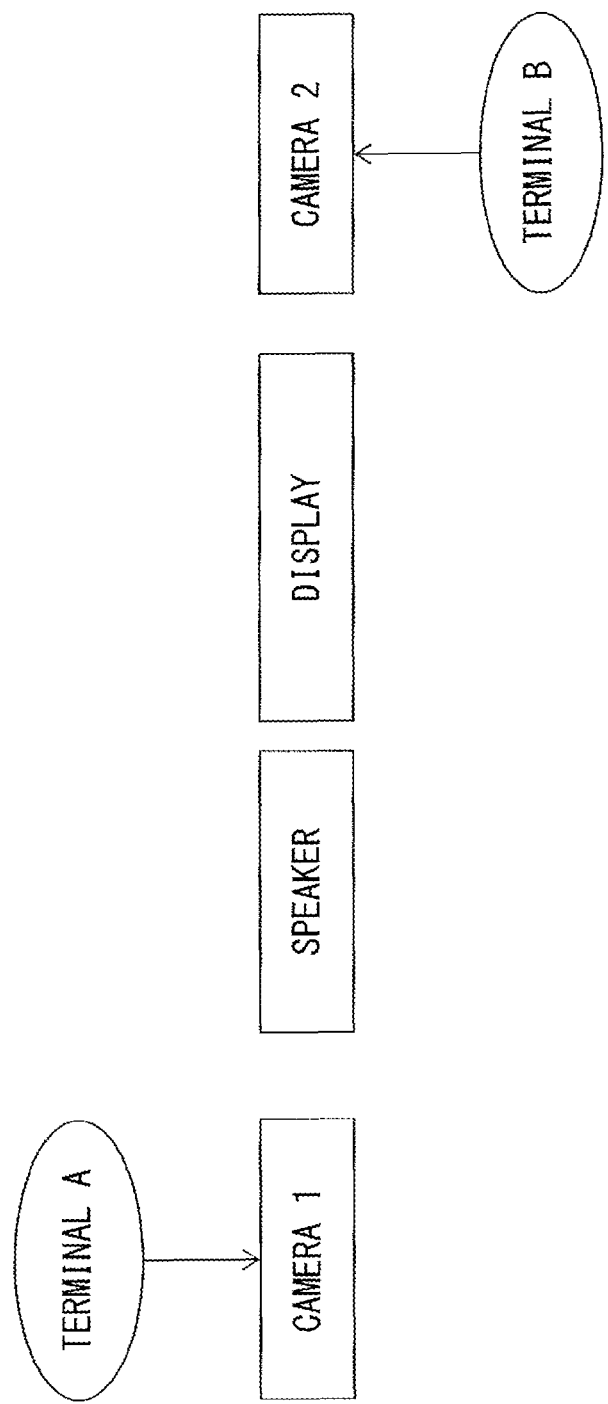
FIG. 31B is a diagram explaining an example of deadlock detection and elimination (no. 2).
Figure 31C:
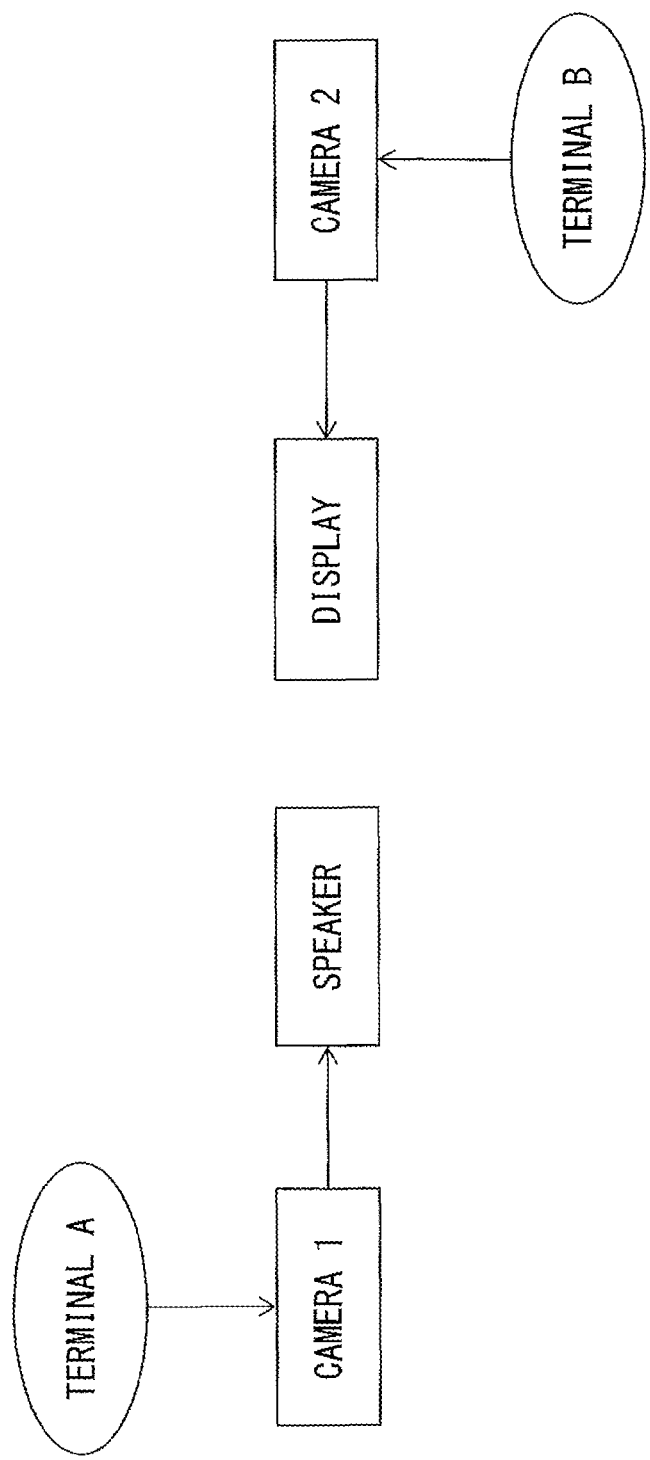
FIG. 31C is a diagram explaining an example of deadlock detection and elimination (no. 3).
Figure 31D:
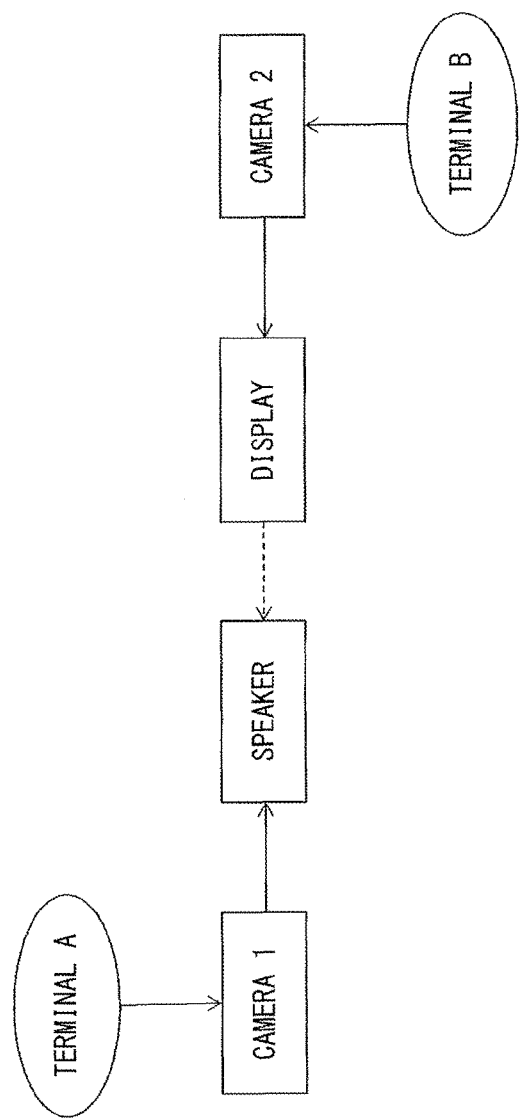
FIG. 31D is a diagram explaining an example of deadlock detection and elimination (no. 4).
Figure 31E:
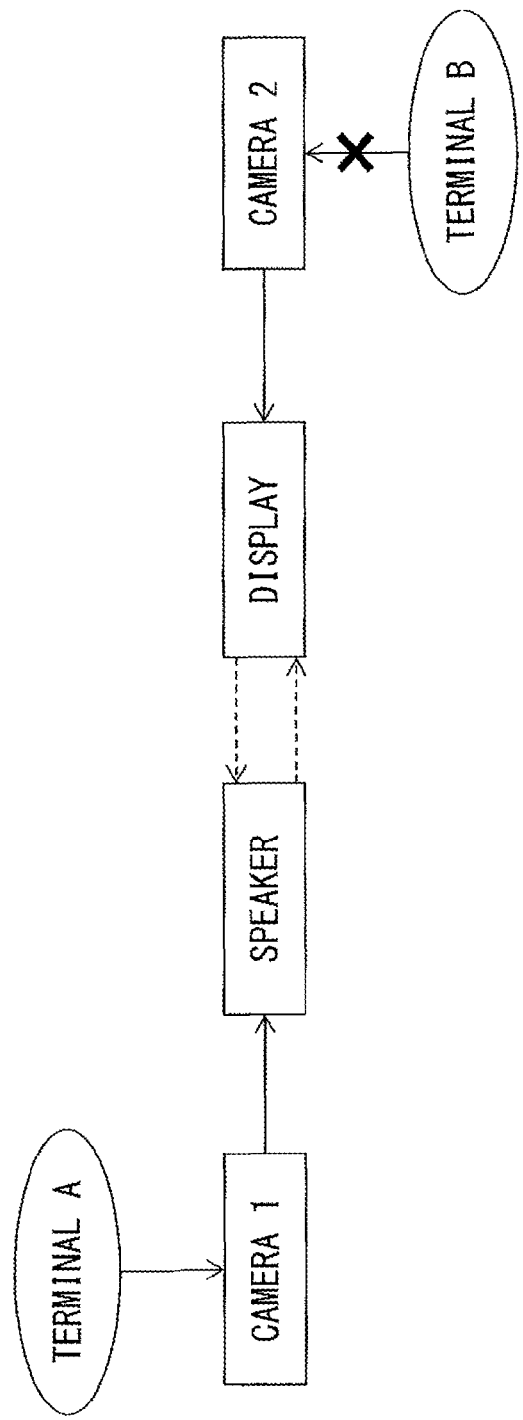
FIG. 31E is a diagram explaining an example of deadlock detection and elimination (no. 5).
Figure 31F:
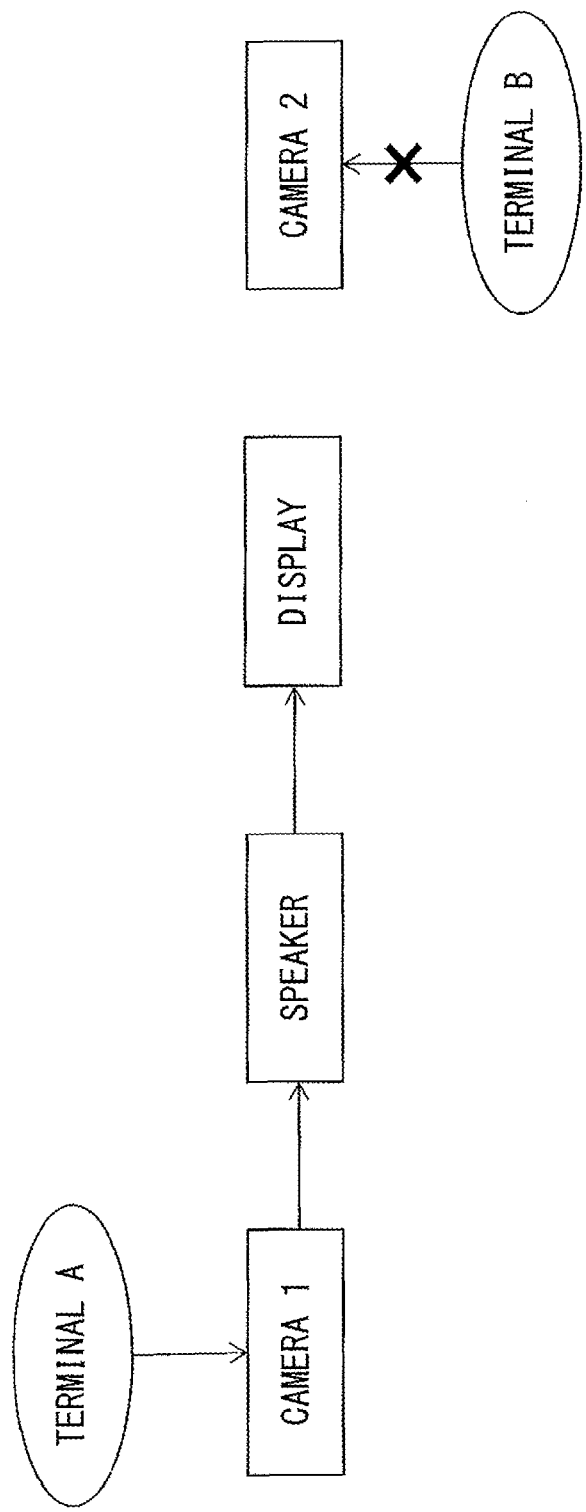
FIG. 31F is a diagram explaining an example of deadlock detection and elimination (no. 6).

With reference to FIGS. 30-31F, a system 30 according to the embodiment is described. The system 30 is a system for projecting states of booths in which people are gathering in an exhibition hall in which each of the booths is provided with a plurality of cameras with microphones, using one loud-sound speaker and one large-screen display.

In the system 30 illustrated in FIG. 30, in a conference room, an operator C has a terminal A (302), and an operator D has a terminal B (304). In the conference room, a camera 1 (306), a camera 2 (308), a speaker 310, and a display 312 are further provided.

Each of the terminals and devices described above includes a distributed data processing device as illustrated in FIG. 8.

The operators C and D (e.g., operators of the exhibition hall) in the system 30 respectively have a portable terminal A (302) and a portable terminal B (304), and when the operators C and D enter within a prescribed camera detection range, the terminals automatically occupy the cameras with microphones 306 and 308, the display 312, and the speaker 310 that are closest to the terminals, and output video and sound from the cameras with microphones 306 and 308 to the display 312 and the speaker 310, respectively. The system 30 may be a system that is operated by an equipment cooperation application that automatically performs equipment cooperation in accordance with a user's position.

The equipment cooperation application is sometimes operated in a plurality of terminals. In order to prevent projected camera video from being switched in a short time even in this case, each of the camera 1 (306), the camera 2 (308), the speaker 310, and the display 312 gives an operation occupation right to the terminal A (302) and the terminal B (304) for a prescribed time period, and after the terminals are given the occupation rights, the terminals perform a cooperative operation of the camera 306 or 308 on the speaker 310 and the display 312. In other words, when the terminal A (302) and the terminal B (304) finishes the occupation of each of the cameras 306 and 308, the speaker 310, and the display 312, cameras are switched that transmit information to the speaker 310 and the display 312. In order to improve the utilization efficiency of equipment, an occupation right of a device such as the camera 1 (306), the camera 2 (308), or the display 312 is not sequentially secured, but a configuration is employed in which messages for securing occupation rights are simultaneously transmitted to all needed pieces of equipment. Accordingly, this configuration may result in generation of a deadlock of an occupation right of a device between the terminal A (302) and the terminal B (304).

In addition, the terminal A (302) and the terminal B (304) sometimes enter into a sleep state in order to suppress battery consumption. When the terminals are in a sleep state, operation such as the transmission of a deadlock detection message is not performed. As described above, the system 30 has a configuration in which the terminal A (302) and the terminal B (304) sometimes enter into a sleep state and a deadlock may occur.

Described below is an example of operation in a deadlock detecting/eliminating method in a state as illustrated in FIG. 30. It is assumed that a deadlock elimination policy in this example is that a terminal that occupies equipment the earliest is not aborted, namely, that an occupation right of a terminal that occupies equipment the latest is rescinded.

FIGS. 31A-31F are diagrams explaining an example of deadlock detection and elimination.

As illustrated in FIG. 31A, the operators of the terminal A (302) and the terminal B (304) respectively enter within equipment cooperation ranges of the camera 1 (306) and the camera 2 (308), and commence equipment cooperation. When this happens, the terminal A (302) transmits occupation right request messages to the camera 1 (306), the speaker 310, and the display 312, and the terminal B (304) transmits occupation right request messages to the camera 2 (308), the speaker 310, and the display 312.

As illustrated in FIG. 31B, the terminal A (302) and the terminal B (304) first receive occupation right permission messages from the camera 1 (306) and the camera 2 (308), respectively, and the resource adding/updating units 2062 of the resource circulant graph updating units 206 of the terminal A (302) and the terminal B (304) respectively update pieces of information on previous/next nodes stored in the resource circulant graph DBs 210 of the terminals. As a result, the terminal A (302) has an occupation right of the camera 1 (306), and the terminal B (304) has an occupation right of the camera 2 (308).

Then, as illustrated in FIG. 31C, the terminal A (302) and the terminal B (304) receive occupation right permission messages from the speaker 310 and the display 312, respectively, and the resource adding/updating units 2062 of the resource circulant graph updating units 206 of the terminal A (302) and the terminal B (304) respectively update pieces of information on previous/next nodes stored in the resource circulant graph DBs 210 of the terminals. As a result, the terminal A (302) has occupation rights of the camera 1 (306) and the speaker 310, and the terminal B (304) has occupation rights of the camera 2 (308) and the display 312.

Further, as illustrated in FIG. 31D, the speaker 310 transmits a control right waiting message to the terminal B (304), and the terminal B (304) enters into a state of waiting for a control right of the speaker 310.

Here, the terminal B (304) transmits a deadlock detection message to the camera 2. The deadlock detection message is transferred to the camera 2 (308), the display 312, and the speaker 310, but a deadlock is not detected because a cycle path has not been generated in the resource circulant graph.

Then, as illustrated in FIG. 31E, the display 312 transmits a control right waiting message to the terminal A, and the terminal A (302) enters into a state of waiting for a control right of the display 312.

Here, it is assumed that the terminal B (304) has a small battery residual capacity and enters into a sleep state. When this happens, the terminal A (302) transmits a deadlock detection message, and because the deadlock detection message is transferred to the camera 1 (306), the speaker 310, the display 312, and the speaker 310, the deadlock detection unit 200 of the speaker 310 detects a deadlock. Then, the deadlock eliminating unit 204 of the speaker 310 determines that a device for which a control right is to be released is the display 312, on the basis of a resource securing time described in the deadlock detection message, and transmits a control right release message from the speaker 310 to the display 312.

Finally, as illustrated in FIG. 31F, the terminal A (302) obtains a control right of the display 312, and the deadlock is eliminated.

As described above, even when a terminal fails to communicate with a controlled device, deadlocks can be detected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A distributed data processing device of a system including a plurality of terminals and a plurality of controlled devices that give control rights to control operations of the plurality of controlled devices to the plurality of terminals, respectively such that the operations are controlled, the distributed data processing device comprising:
a processor configured to receive a deadlock detection message that is transferred between the plurality of controlled devices so as to be and subsequently transferred between a plurality of nodes along a first link and a second link in a resource circulant graph that is configured by combining the plurality of nodes, which respectively correspond to the plurality of controlled devices, using the first link and the second link, the first link extending from a first node corresponding to a first controlled device whose control right a first terminal has to a second node corresponding to a second controlled device whose control right the first terminal has, the second link extending from a third node corresponding to a third controlled device whose control right a second terminal has to a fourth node corresponding to a fourth controlled device whose control right the second terminal waits to be given and determine whether a deadlock has occurred on the basis of a transfer history of the deadlock detection message.

2. The distributed data processing device according to claim 1, wherein
the processor determines that a deadlock has occurred when the deadlock detection message arrives at one of the plurality of controlled devices plural multiple times.

3. The distributed data processing device according to claim 1, further comprising:
a storage device configured to store information on a previous node, a next node, and a standby node, the previous node being set so as to be one of the plurality of controlled devices that corresponds to a start point of the first link when the distributed data processing device is one of the plurality of controlled devices that corresponds to an end point of the first link, the next node being set so as to be one of the plurality of controlled devices that corresponds to the end point of the first link when the distributed data processing device is one of the plurality of controlled devices that corresponds to the start point of the first link, the standby node being set so as to be one of the plurality of controlled devices that corresponds to an endpoint of the second link when the distributed data processing device is one of the plurality of controlled devices that corresponds to a start point of the second link,
each of the nodes in the resource circulant graph being provided with the information on the previous node, the next node, and the standby node that has been stored in the storage unit.

4. The distributed data processing device according to claim 1, wherein when the processor determines that the deadlock has occurred, the processor further transmits a report for releasing the control right to one of the plurality of terminals that has the control right of one of the plurality of controlled devices in the resource circulant graph in order to eliminate the deadlock.

5. The distributed data processing device according to claim 1, wherein
the deadlock detection message includes information on priorities of the plurality of controlled devices in the resource circulant graph, and
the processor further transmits a report for releasing the control right to one of the plurality of terminals that has the control right of one of the plurality of controlled devices in the resource circulant graph on the basis of the priorities included in the deadlock detection message in order to eliminate the deadlock when the processor determines that the deadlock has occurred.

6. A distributed data processing method that is performed by a processor of one of a plurality of terminals that function as computers or a processor of one of a plurality of controlled devices that function as computers in a system including the plurality of terminals and the plurality of controlled devices, the plurality of controlled devices giving control rights to control operations of the plurality of controlled devices to the plurality of terminals, respectively such that the operations are controlled, the distributed data processing method comprising:
receiving, by the processor, a deadlock detection message that is transferred between the plurality of controlled devices so as to be and subsequently transferred between a plurality of nodes along a first link and a second link in a resource circulant graph that is configured by combining the plurality of nodes, which respectively correspond to the plurality of controlled devices, using the first link and the second link, the first link extending from a first node corresponding to a first controlled device whose control right a first terminal has to a second node corresponding to a second controlled device whose control right the first terminal has, the second link extending from a third node corresponding to a third controlled device whose control right a second terminal has to a fourth node corresponding to a fourth controlled device whose control right the second terminal waits to be given; and
determining, by the processor, whether a deadlock has occurred on the basis of a transfer history of the deadlock detection message.

7. The distributed data processing method according to claim 6, wherein
the determining whether a deadlock has occurred is determining that a deadlock has occurred when the deadlock detection message arrives at one of the plurality of controlled devices plural multiple times.

8. The distributed data processing method according to claim 6, further comprising:
storing, by the processor, information on a previous node, a next node, and a standby node, the previous node being set so as to be one of the plurality of controlled devices that corresponds to a start point of the first link when a host node is one of the plurality of controlled devices that corresponds to an end point of the first link, the next node being set so as to be one of the plurality of controlled devices that corresponds to the end point of the first link when the host node is one of the plurality of controlled devices that corresponds to the start point of the first link, the standby node being set so as to be one of the plurality of controlled devices that corresponds to an end point of the second link when the host node is one of the plurality of controlled devices that corresponds to a start point of the second link,
each of the nodes in the resource circulant graph being provided with the information on the previous node, the next node, and the standby node.

9. The distributed data processing method according to claim 6, further comprising:
transmitting, by the processor, a report for releasing the control right to one of the plurality of terminals that has the control right of one of the plurality of controlled devices in the resource circulant graph in order to eliminate the deadlock when it is determined that the deadlock has occurred.

10. The distributed data processing method according to claim 6,
the deadlock detection message including information on priorities of the plurality of controlled devices in the resource circulant graph,
the distributed data processing method further comprising:
transmitting, by the processor, a report for releasing the control right to one of the plurality of terminals that has the control right of one of the plurality of controlled devices in the resource circulant graph on the basis of the priorities included in the deadlock detection message in order to eliminate the deadlock when it is determined that the deadlock has occurred.

11. A non-transitory computer-readable recording medium having stored therein a distributed data processing program for causing a computer to execute a process, the distributed data processing program being performed by one of a plurality of terminals that function as computers or one of a plurality of controlled devices that function as computers in a system including the plurality of terminals and the plurality of controlled devices, the plurality of controlled devices giving control rights to control operations of the plurality of controlled devices to the plurality of terminals, respectively such that the operations are controlled, the process comprising:
receiving a deadlock detection message that is transferred between the plurality of controlled devices so as to be and subsequently transferred between a plurality of nodes along a first link and a second link in a resource circulant graph that is configured by combining the plurality of nodes, which respectively correspond to the plurality of controlled devices, using the first link and the second link, the first link extending from a first node corresponding to a first controlled device whose control right a first terminal has to a second node corresponding to a second controlled device whose control right the first terminal has, the second link extending from a third node corresponding to a third controlled device whose control right a second terminal has to a fourth node corresponding to a fourth controlled device whose control right the second terminal waits to be given; and
determining whether a deadlock has occurred on the basis of a transfer history of the deadlock detection message.

12. The non-transitory computer-readable recording medium according to claim 11, wherein the determining whether a deadlock has occurred is determining that a deadlock has occurred when the deadlock detection message arrives at one of the plurality of controlled devices plural multiple times.

13. The non-transitory computer-readable recording medium according to claim 11, the process further comprising:
    storing information on a previous node, a next node, and a standby node, the previous node being set so as to be one of the plurality of controlled devices that corresponds to a start point of the first link when a host node is one of the plurality of controlled devices that corresponds to an end point of the first link, the next node being set so as to be one of the plurality of controlled devices that corresponds to the end point of the first link when the host node is one of the plurality of controlled devices that corresponds to the start point of the first link, the standby node being set so as to be one of the plurality of controlled devices that corresponds to an end point of the second link when the host node is one of the plurality of controlled devices that corresponds to a start point of the second link,
    each of the nodes in the resource circulant graph being provided with the information on the previous node, the next node, and the standby node.

14. The non-transitory computer-readable recording medium according to claim 11, the process further comprising:
    transmitting a report for releasing the control right to one of the plurality of terminals that has the control right of one of the plurality of controlled devices in the resource circulant graph in order to eliminate the deadlock when it is determined that the deadlock has occurred.

15. The non-transitory computer-readable recording medium according to claim 11, wherein
    the deadlock detection message including information on priorities of the plurality of controlled devices in the resource circulant graph, the process further comprising:
    transmitting a report for releasing the control right to one of the plurality of terminals that has the control right of one of the plurality of controlled devices in the resource circulant graph on the basis of the priorities included in the deadlock detection message in order to eliminate the deadlock when it is determined that the deadlock has occurred.

* * * * *